(12) United States Patent
Stauffer

(10) Patent No.: US 9,032,645 B2
(45) Date of Patent: May 19, 2015

(54) SUPPORT FEATURES FOR FOOTWEAR GROUND ENGAGING MEMBERS

(75) Inventor: Morgan Stauffer, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 295 days.

(21) Appl. No.: 13/561,557

(22) Filed: Jul. 30, 2012

(65) Prior Publication Data

US 2014/0026441 A1 Jan. 30, 2014

(51) Int. Cl.
| | | |
|---|---|---|
| A43B 13/04 | (2006.01) | |
| A43C 15/00 | (2006.01) | |
| A43B 5/02 | (2006.01) | |
| A43B 13/02 | (2006.01) | |
| A43B 13/12 | (2006.01) | |
| A43B 13/14 | (2006.01) | |
| A43B 13/22 | (2006.01) | |
| A43B 13/26 | (2006.01) | |
| A43B 23/22 | (2006.01) | |
| A43C 15/16 | (2006.01) | |
| B29D 35/12 | (2010.01) | |

(52) U.S. Cl.
CPC . *A43C 15/00* (2013.01); *A43B 5/02* (2013.01); *A43B 13/026* (2013.01); *A43B 13/122* (2013.01); *A43B 13/141* (2013.01); *A43B 13/223* (2013.01); *A43B 13/26* (2013.01); *A43B 23/22* (2013.01); *A43C 15/162* (2013.01); *A43C 15/167* (2013.01); *B29D 35/122* (2013.01)

(58) Field of Classification Search
CPC .......................................... A43C 13/04
USPC ........................... 36/67 R, 67 D, 134
See application file for complete search history.

(56) References Cited

U.S. PATENT DOCUMENTS

| | | | |
|---|---|---|---|
| 830,324 | A | 9/1906 | Hunt |
| 1,361,078 | A | 12/1920 | Lynn |
| 2,087,945 | A | 7/1937 | Butler |

(Continued)

FOREIGN PATENT DOCUMENTS

| | | |
|---|---|---|
| CA | 2526727 | 5/2007 |
| DE | 930798 | 7/1955 |

(Continued)

OTHER PUBLICATIONS

Pending U.S. Appl. No. 13/561,608, filed Jul. 30, 2012.

(Continued)

*Primary Examiner* — Marie Bays
(74) *Attorney, Agent, or Firm* — Plumsea Law Group, LLC

(57) ABSTRACT

An article of footwear may include an upper and a sole structure fixedly attached to a bottom portion of the upper. The sole structure may include a sole component including a baseplate having a bottom surface and at least a first ground engaging member extending substantially downward from the bottom surface of the baseplate, the first ground engaging member having a substantially circular cross-sectional shape. In addition, the sole structure may also include a tapered support structure having a substantially pyramidal shape and extending substantially downward from the bottom surface of the baseplate, abutting the first ground engaging member at a side portion, and partially surrounding the first ground engaging member such that a portion of the first ground engaging member is exposed between edges of the tapered support structure. Also, the tapered support structure may extend downward from the baseplate less than the first ground engaging member.

27 Claims, 15 Drawing Sheets

(56) References Cited

U.S. PATENT DOCUMENTS

| | | | |
|---|---|---|---|
| 2,095,095 A | 10/1937 | Howard | |
| 2,185,397 A * | 1/1940 | Birchfield | 36/59 R |
| 2,222,650 A * | 11/1940 | Brady | 36/59 R |
| 3,043,026 A | 7/1962 | Semon | |
| 3,063,171 A | 11/1962 | Hollander | |
| 3,328,901 A * | 7/1967 | Strickland | 36/59 R |
| 3,352,034 A * | 11/1967 | Braun | 36/67 D |
| 3,413,737 A * | 12/1968 | Kneebusch | 36/67 D |
| 3,481,820 A | 12/1969 | Jonas | |
| 3,619,916 A | 11/1971 | Neri | |
| 3,631,614 A | 1/1972 | Rice | |
| 3,656,245 A * | 4/1972 | Wilson | 36/67 D |
| 3,775,874 A | 12/1973 | Bonneville | |
| 3,898,751 A * | 8/1975 | Gustin | 36/67 D |
| 3,951,407 A | 4/1976 | Calacurcio | |
| 4,085,527 A | 4/1978 | Riggs | |
| 4,096,649 A | 6/1978 | Saurwein | |
| 4,146,979 A | 4/1979 | Fabbrie | |
| 4,315,374 A * | 2/1982 | Sneeringer | 36/126 |
| 4,319,412 A | 3/1982 | Muller et al. | |
| 4,375,728 A | 3/1983 | Dassler | |
| 4,375,729 A | 3/1983 | Buchanen, III | |
| 4,633,600 A | 1/1987 | Dassler et al. | |
| 4,667,425 A | 5/1987 | Effler et al. | |
| 4,674,200 A | 6/1987 | Sing | |
| 4,698,923 A | 10/1987 | Arff | |
| 4,715,133 A | 12/1987 | Hartjes et al. | |
| 4,833,796 A | 5/1989 | Flemming | |
| 4,873,774 A | 10/1989 | Lafever | |
| 5,221,379 A | 6/1993 | Nicholas | |
| 5,289,647 A | 3/1994 | Mercer | |
| 5,299,369 A | 4/1994 | Goldman | |
| 5,339,544 A | 8/1994 | Caberlotto | |
| 5,351,422 A | 10/1994 | Fitzgerald | |
| 5,367,791 A | 11/1994 | Gross et al. | |
| 5,410,823 A | 5/1995 | Lyoob | |
| 5,461,801 A | 10/1995 | Anderton | |
| 5,513,451 A | 5/1996 | Kataoka et al. | |
| 5,526,589 A | 6/1996 | Jordan | |
| 5,634,283 A | 6/1997 | Kastner | |
| 5,709,954 A | 1/1998 | Lyden et al. | |
| 5,775,010 A | 7/1998 | Kaneko | |
| 5,806,209 A | 9/1998 | Crowley et al. | |
| 5,815,951 A | 10/1998 | Jordan | |
| 5,887,371 A | 3/1999 | Curley, Jr. | |
| 5,946,828 A | 9/1999 | Jordan et al. | |
| 5,956,871 A | 9/1999 | Korsen | |
| D415,340 S | 10/1999 | McMullin | |
| 5,979,083 A | 11/1999 | Robinson et al. | |
| 6,016,613 A | 1/2000 | Campbell et al. | |
| 6,079,127 A | 6/2000 | Nishimura et al. | |
| 6,112,433 A | 9/2000 | Greiner | |
| 6,125,556 A | 10/2000 | Peckler et al. | |
| 6,161,315 A | 12/2000 | Dalton | |
| D437,989 S | 2/2001 | Cass | |
| 6,256,907 B1 | 7/2001 | Jordan et al. | |
| 6,357,146 B1 * | 3/2002 | Wordsworth et al. | 36/128 |
| 6,389,714 B1 | 5/2002 | Mack | |
| 6,481,122 B2 | 11/2002 | Brahler | |
| D468,517 S | 1/2003 | Recchi et al. | |
| 6,550,160 B2 | 4/2003 | Miller, II | |
| 6,647,647 B2 | 11/2003 | Auger et al. | |
| 6,675,505 B2 | 1/2004 | Terashima | |
| 6,698,110 B1 | 3/2004 | Robbins | |
| 6,739,075 B2 | 5/2004 | Sizemore | |
| D495,122 S | 8/2004 | McMullin | |
| 6,817,117 B1 | 11/2004 | Campbell | |
| 6,834,446 B2 | 12/2004 | McMullin | |
| 6,904,707 B2 | 6/2005 | McMullin | |
| 6,915,595 B2 | 7/2005 | Kastner | |
| 6,915,596 B2 | 7/2005 | Grove et al. | |
| 6,973,746 B2 | 12/2005 | Auger et al. | |
| 7,143,530 B2 | 12/2006 | Hudson et al. | |
| 7,194,826 B2 | 3/2007 | Ungari | |
| 7,234,250 B2 | 6/2007 | Fogarty et al. | |
| 7,254,909 B2 | 8/2007 | Ungari | |
| 7,269,916 B2 | 9/2007 | Biancucci et al. | |
| 7,287,343 B2 | 10/2007 | Healy | |
| 7,370,439 B1 | 5/2008 | Myers | |
| 7,386,948 B2 | 6/2008 | Sink | |
| 7,409,783 B2 | 8/2008 | Chang | |
| D578,280 S | 10/2008 | Wilken | |
| 7,430,819 B2 | 10/2008 | Auger et al. | |
| 7,490,418 B2 | 2/2009 | Obeydani | |
| 7,559,160 B2 | 7/2009 | Kelly | |
| 7,584,554 B2 | 9/2009 | Fogarty et al. | |
| 7,654,013 B2 | 2/2010 | Savoie et al. | |
| 7,784,196 B1 | 8/2010 | Christensen et al. | |
| D632,466 S | 2/2011 | Kasprzak | |
| 8,079,160 B2 | 12/2011 | Baucom et al. | |
| 8,122,617 B1 | 2/2012 | Dixon et al. | |
| 8,256,145 B2 | 9/2012 | Baucom et al. | |
| 2002/0017036 A1 | 2/2002 | Berger et al. | |
| 2002/0078603 A1 | 6/2002 | Schmitt, Jr. | |
| 2002/0100190 A1 | 8/2002 | Pellerin | |
| 2002/0178619 A1 | 12/2002 | Schaudt et al. | |
| 2003/0033731 A1 | 2/2003 | Sizemore | |
| 2003/0188458 A1 | 10/2003 | Kelly | |
| 2004/0000075 A1 | 1/2004 | Auger et al. | |
| 2004/0035024 A1 | 2/2004 | Kao | |
| 2004/0187356 A1 | 9/2004 | Patton | |
| 2004/0250451 A1 | 12/2004 | McMullin | |
| 2005/0016029 A1 * | 1/2005 | Auger et al. | 36/134 |
| 2005/0072026 A1 | 4/2005 | Sink | |
| 2005/0108898 A1 | 5/2005 | Jeppesen et al. | |
| 2005/0217149 A1 | 10/2005 | Ho | |
| 2005/0257405 A1 | 11/2005 | Kilgore | |
| 2005/0268490 A1 | 12/2005 | Foxen | |
| 2006/0016101 A1 | 1/2006 | Ungari | |
| 2006/0021254 A1 | 2/2006 | Jones | |
| 2006/0130372 A1 | 6/2006 | Auger et al. | |
| 2006/0242863 A1 | 11/2006 | Patmore | |
| 2007/0261271 A1 | 11/2007 | Krouse | |
| 2007/0266597 A1 | 11/2007 | Jones | |
| 2008/0066348 A1 | 3/2008 | O'Brien et al. | |
| 2008/0098624 A1 | 5/2008 | Goldman | |
| 2008/0196276 A1 | 8/2008 | McMullin | |
| 2009/0056172 A1 | 3/2009 | Cho | |
| 2009/0126230 A1 | 5/2009 | McDonald et al. | |
| 2009/0223088 A1 | 9/2009 | Krikorian et al. | |
| 2009/0241370 A1 | 10/2009 | Kimura | |
| 2009/0307933 A1 | 12/2009 | Leach | |
| 2010/0077635 A1 | 4/2010 | Baucom et al. | |
| 2010/0083541 A1 | 4/2010 | Baucom et al. | |
| 2010/0212190 A1 | 8/2010 | Schmid | |
| 2010/0251578 A1 | 10/2010 | Auger et al. | |
| 2010/0313447 A1 | 12/2010 | Becker et al. | |
| 2011/0047830 A1 | 3/2011 | Francello et al. | |
| 2011/0078922 A1 | 4/2011 | Cavaliere et al. | |
| 2011/0078927 A1 | 4/2011 | Baker | |
| 2011/0088287 A1 | 4/2011 | Auger et al. | |
| 2011/0126426 A1 | 6/2011 | Amark | |
| 2011/0167676 A1 | 7/2011 | Benz et al. | |
| 2011/0197475 A1 | 8/2011 | Weidl et al. | |
| 2011/0197478 A1 | 8/2011 | Baker | |
| 2011/0203136 A1 | 8/2011 | Auger | |
| 2012/0180343 A1 | 7/2012 | Auger et al. | |

FOREIGN PATENT DOCUMENTS

| | | | |
|---|---|---|---|
| DE | 1809860 | 4/1960 | |
| DE | 3046811 | 7/1982 | |
| DE | 3245182 | 5/1983 | |
| DE | 3600525 | 10/1987 | |
| DE | 3644812 | 6/1988 | |
| DE | 4014064 A1 * | 11/1991 | A43D 5/02 |
| DE | 19817579 | 10/1999 | |
| EP | 0223700 | 5/1987 | |
| EP | 340053 | 11/1989 | |
| EP | 1025771 | 8/2000 | |
| EP | 1714571 | 10/2006 | |
| EP | 1839511 | 10/2007 | |
| EP | 2057913 | 5/2009 | |
| EP | 2499928 | 9/2012 | |

(56) References Cited

FOREIGN PATENT DOCUMENTS

| | | |
|---|---|---|
| FR | 1554061 | 1/1969 |
| FR | 2567004 | 1/1986 |
| FR | 2818876 | 7/2002 |
| GB | 1329314 | 9/1973 |
| GB | 2020161 | 11/1979 |
| GB | 2256784 | 12/1992 |
| GB | 2377616 | 1/2003 |
| JP | 10000105 | 1/1998 |
| JP | 11276204 | 10/1999 |
| JP | 2004024811 | 1/2004 |
| TW | 540323 | 7/2003 |
| TW | M267886 | 6/2005 |
| WO | 0053047 | 9/2000 |
| WO | 03071893 | 9/2003 |
| WO | 2006103619 | 10/2006 |
| WO | 2008069751 | 6/2008 |
| WO | 2008128712 | 10/2008 |
| WO | 2009110822 | 9/2009 |
| WO | 2010036988 | 4/2010 |
| WO | 2010057207 | 5/2010 |
| WO | 2012150971 | 11/2012 |
| WO | 2014/022259 A1 | 2/2014 |

OTHER PUBLICATIONS

Pending U.S. Appl. No. 13/705,600, filed Dec. 5, 2012.
Pending U.S. Appl. No. 13/705,622, filed Dec. 5, 2012.
Invitation to Pay Additional Fees and, Where Applicable, Protest Fee mailed Jan. 7, 2013 in International Application No. PCT/US2012/052968.
Invitation to Pay Additional Fees and, Where Applicable, Protest Fee mailed Jan. 8, 2013 in International Application No. PCT/US2012/052970.
Invitation to Pay Additional Fees and, Where Applicable, Protest Fee mailed Jan. 7, 2013 in International Application No. PCT/US2012/052965.
International Search Report and Written Opinion mailed Jan. 22, 2013 in International Application No. PCT/US2012/052972.
Invitation to Pay Additional Fees and, Where Applicable, Protest Fee mailed Feb. 8, 2013 in International Application No. PCT/US2012/052963.
International Search Report and Written Opinion mailed Mar. 8, 2013 in International Application No. PCT/US2012/052965.
International Search Report and Written Opinion mailed Mar. 8, 2013 in International Application No. PCT/US2012/052968.
International Search Report and Written Opinion mailed Mar. 8, 2013 in International Application No. PCT/US2012/052970.
International Search Report and Written Opinion for PCT/US2011/045356 dated Dec. 16, 2011.
International Search Report and Written Opinion for PCT/US2011/022841 dated Apr. 15, 2011.
International Search Report and Written Opinion for PCT/US2011/022848 dated Jun. 20, 2011.
Aug. 12, 2010, Icebug Web Page (date based on information from Internet Archive).
Dec. 23, 2008, Icebug Web Page (date based on information from Internet Archive).
Pending U.S. Appl. No. 13/234,182, filed Sep. 16, 2011.
Pending U.S. Appl. No. 13/234,183, filed Sep. 16, 2011.
Pending U.S. Appl. No. 13/234,185, filed Sep. 16, 2011.
Pending U.S. Appl. No. 13/009,549, filed Jan. 19, 2011.
Pending U.S. Appl. No. 13/234,244, filed Sep. 16, 2011.
Pending U.S. Appl. No. 12/582,252, filed Oct. 20, 2009.
Pending U.S. Appl. No. 13/234,233, filed Sep. 16, 2011.
Pending U.S. Appl. No. 13/234,180, filed Sep. 16, 2011.
International Search Report for PCT/US2010/050637 dated Jan. 14, 2011.
Partial Search Report for PCT/US2009/058522 dated Mar. 4, 2010.
U.S. Appl. No. 12/239,190, filed Sep. 26, 2008.
U.S. Appl. No. 12/566,792, filed Sep. 25, 2009.
U.S. Appl. No. 12/711,107, filed Feb. 23, 2010.
U.S. Appl. No. 12/708,411, filed Feb. 18, 2010.
U.S. Appl. No. 12/572,154, filed Oct. 1, 2009.
International Search Report for PCT/US2009/058522 dated Feb. 17, 2010.
International Search Report for PCT/US2010/029640 dated May 17, 2010.
International Search Report and Written Opinion for International Application No. PCT/US2013/052464 mailed Dec. 11, 2013.

* cited by examiner

SUPPORT FEATURES FOR FOOTWEAR GROUND ENGAGING MEMBERS

FIELD OF THE INVENTION

The present invention relates generally to a sole structure for an article of footwear and, more particularly, to support features for ground engaging members, as well as a shank arrangement.

BACKGROUND

It is advantageous, when participating in various activities, to have footwear that provides traction and stability on the surface upon which the activities take place. Accordingly, sole structures for articles of footwear have been developed with traction systems that include ground engaging members to provide traction on a variety of surfaces. Examples include cleated shoes developed for outdoor sports, such as soccer, football, and baseball. In addition, articles of footwear have been developed with baseplate reinforcement features, such as shanks.

The present disclosure is directed to improvements in existing sole structure traction and reinforcement systems.

SUMMARY

In one aspect, the present disclosure is directed to an article of footwear including an upper configured to receive a foot and a sole component fixedly attached to a bottom portion of the upper. The sole component may include a baseplate having a bottom surface. The sole component may also include at least a first ground engaging member extending substantially downward from the bottom surface of the baseplate, the ground engaging member having a stepped cross-sectional size with an upper portion of the ground engaging member having a larger cross-sectional size than a lower portion of the ground engaging member, the transition between the upper portion and the lower portion forming a step. The sole component may also include a first elongate support member extending substantially downward from the bottom surface of the baseplate, abutting the first ground engaging member at a side portion, and extending horizontally from the side portion of the first ground engaging member independent of other ground engaging members. The first support member may project downward from the baseplate and extend below the step in the cross-section of the ground engaging member.

In another aspect, the present disclosure is directed to an article of footwear including an upper configured to receive a foot and a sole component fixedly attached to a bottom portion of the upper. The sole component may include a baseplate having a bottom surface and including a substantially square platform having a lower surface. The sole component may also include at least a first ground engaging member extending downward from the lower surface of the substantially square platform, the first ground engaging member having a substantially circular cross-sectional shape. In addition, the sole component may include a first elongate support member abutting the first ground engaging member at a side portion, and extending downward from the baseplate and horizontally from the side portion of the first ground engaging member, the first elongate support member attaching to the lower surface of the substantially square platform proximate a first corner of the substantially square platform.

In another aspect, the present disclosure is directed to an article of footwear including an upper configured to receive a foot and a sole component fixedly attached to a bottom portion of the upper. The sole component may include a baseplate having a bottom surface, a peripheral edge, a longitudinal axis, and a lateral axis. The sole component may further include an arrangement of ground engaging members extending downward from the bottom surface of the baseplate proximate the peripheral edge of the baseplate. Each of the ground engaging members may be located on an axis passing through the respective ground engaging member and oriented substantially perpendicular to the peripheral edge of the baseplate proximate the respective ground engaging member. In addition, the sole component may include a plurality of elongate support members extending downward from the bottom surface of the baseplate and abutting side portions of the ground engaging members. The arrangement of ground engaging members may include at least three ground engaging members, and the plurality of elongate support members may include at least three sets of four evenly spaced support members, the elongate support members of each set abutting one of the at least three ground engaging members. Each support member of the at least three sets of elongate support members may be oriented in substantial non-alignment with the axis of the abutting ground engaging member. In addition, each support member of the at least three sets of elongate support members may be oriented in a substantially non-parallel orientation with respect to the longitudinal axis of the baseplate.

In another aspect, the present disclosure is directed to an article of footwear including an upper configured to receive a foot and a sole component fixedly attached to a bottom portion of the upper. The sole component may include a baseplate having a bottom surface. The sole component may also include an arrangement of ground engaging members extending downward from the bottom surface of the baseplate. The baseplate may further include a reinforcing shank arrangement including a plurality of reinforcing strips formed of a different material than portions of the baseplate adjacent the reinforcing strips, wherein at least one of the reinforcing strips forms at least a portion of a base platform from which at least one of the ground engaging members extends.

In another aspect, the present disclosure is directed to an article of footwear including an upper configured to receive a foot and a sole component fixedly attached to a bottom portion of the upper. The sole component may include a baseplate having a bottom surface. The sole component may further include an arrangement of ground engaging members extending downward from the bottom surface of the baseplate. The sole component may also include a reinforcing shank arrangement including a plurality of reinforcing strips formed of a different material than portions of the baseplate adjacent the reinforcing strips, the plurality of reinforcing strips including a first reinforcing strip and a second reinforcing strip arranged to cross at an intersection forming an X-configuration. The plurality of reinforcing strips may further include a third reinforcing strip extending from the intersection of the first reinforcing strip and the second reinforcing strip into an area between the first reinforcing strip and the second reinforcing strip.

In another aspect, the present disclosure is directed to a method of making a sole component for an article of footwear. The method may include forming a reinforcing shank arrangement including a plurality of reinforcing strips formed of a first material, the plurality of reinforcing strips including a first reinforcing strip and a second reinforcing strip arranged to cross at an intersection forming an X-configuration, the plurality of reinforcing strips further including a third reinforcing strip extending from the intersection of the first reinforcing strip and the second reinforcing strip into an area between the first reinforcing strip and the second reinforcing strip. The method may also include co-molding a second material with the reinforcing strips thereby forming a baseplate formed of the second material reinforced by the reinforcing strips formed of the second material.

In another aspect, the present disclosure is directed to a method of making a sole component for an article of footwear. The method may include forming a reinforcing shank arrangement including a plurality of reinforcing strips formed of a first material. The method may also include co-molding a second material with the reinforcing strips thereby forming a baseplate formed of the second material reinforced by the reinforcing strips formed of the second material. The method may further include forming at least one of the reinforcing strips as at least a portion of a base platform from which at least one of the ground engaging members extends; and forming a plurality of ground engaging members, at least one of the plurality of ground engaging members extending from a lower surface of the base platform.

In another aspect, the present disclosure is directed to an article of footwear, including an upper configured to receive a foot and a sole structure fixedly attached to a bottom portion of the upper. The sole structure may include a sole component including a baseplate having a bottom surface and at least a first ground engaging member extending substantially downward from the bottom surface of the baseplate, the first ground engaging member having a substantially circular cross-sectional shape. In addition, the sole structure may also include a tapered support structure having a substantially pyramidal shape and extending substantially downward from the bottom surface of the baseplate, abutting the first ground engaging member at a side portion, and partially surrounding the first ground engaging member such that a portion of the first ground engaging member is exposed between edges of the tapered support structure. Also, the tapered support structure may extend downward from the baseplate less than the first ground engaging member.

In another aspect, the present disclosure is directed to an article of footwear, including an upper configured to receive a foot and a sole structure fixedly attached to a bottom portion of the upper. The sole structure may include sole component including a baseplate having a bottom surface and at least a first ground engaging member extending substantially downward from the bottom surface of the baseplate. The first ground engaging member may have a substantially circular cross-sectional shape and a central axis extending substantially normal to the baseplate. In addition, the sole component may include a tapered support structure extending substantially downward from the bottom surface of the baseplate and abutting the first ground engaging member at a side portion. The tapered support structure may include a polygonal base where the tapered support structure abuts the baseplate, the polygonal base having at least a first vertex, a second vertex, and a third vertex. Further, the tapered support structure further may include a first side edge extending from the first vertex to a sidewall of the first ground engaging member, a second side edge extending from the second vertex to the sidewall of the first ground engaging member, and a third side edge extending from the third vertex to the sidewall of the first ground engaging member. Also, the first side edge, the second side edge, and the third side edge of the tapered support structure are oriented along axes that intersect at an apex. In addition, the apex may be located offset with respect to the central axis of the first ground engaging member.

In another aspect, the present disclosure is directed to an article of footwear, including an upper configured to receive a foot and a sole structure fixedly attached to a bottom portion of the upper. The sole structure may include sole component including a baseplate having a bottom surface and at least a first ground engaging member extending substantially downward from the bottom surface of the baseplate. In addition, the sole component may include a tapered support structure extending substantially downward from the bottom surface of the baseplate and abutting the ground engaging member at a side portion of the ground engaging member, the tapered support structure at least partially surrounding the ground engaging member. The ground engaging member may have a stepped cross-sectional size with an upper portion of the ground engaging member having a larger cross-sectional size than a lower portion of the ground engaging member, the transition between the upper portion and the lower portion forming a step. Also, the tapered support structure may extend downward from the baseplate below the step in the cross-section of the ground engaging member.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
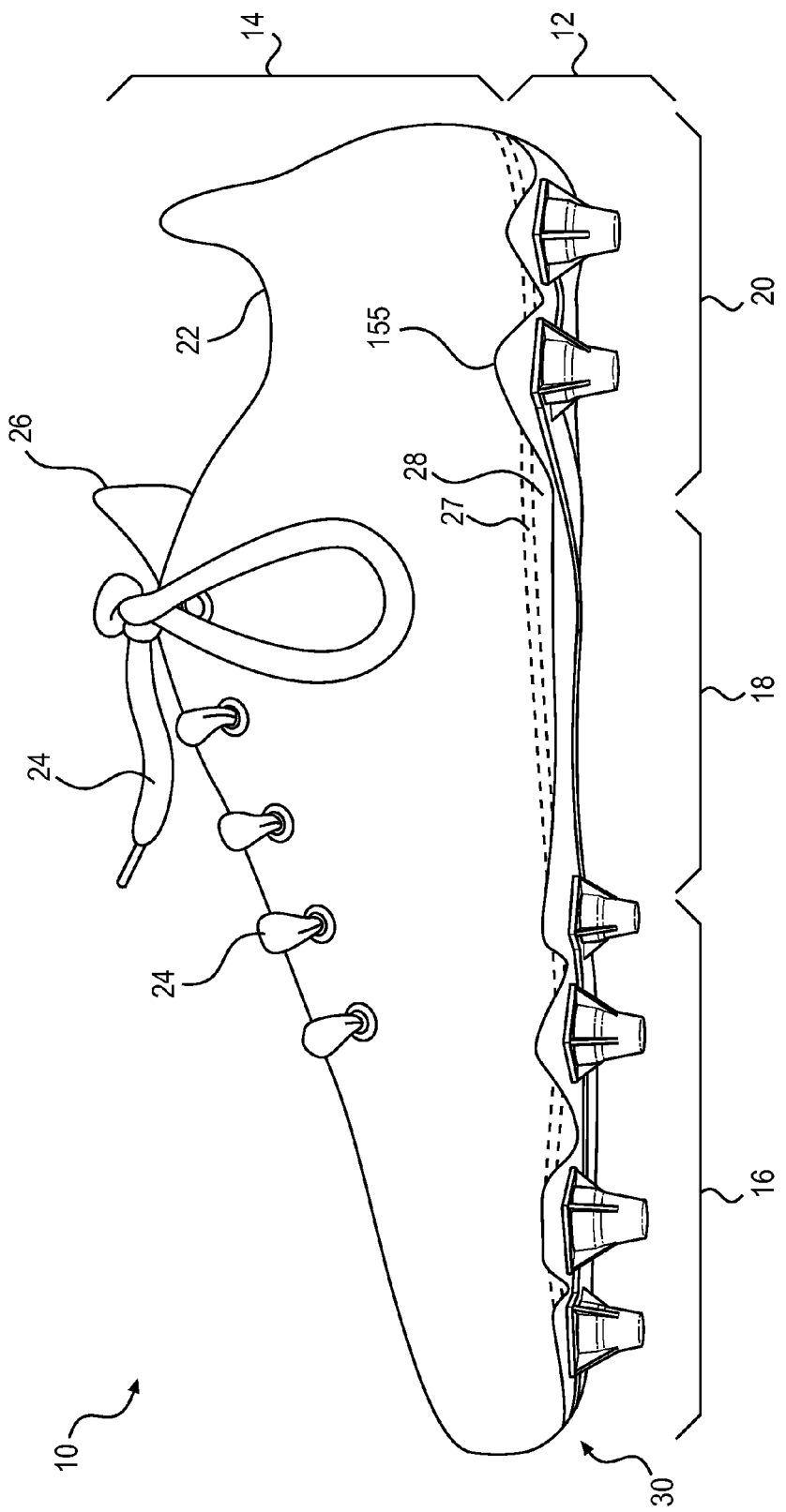
FIG. 1 is a schematic illustration of an exemplary article of footwear having a ground engaging sole component with ground engaging members.

The following discussion and accompanying figures disclose a sole structure for an article of footwear. Concepts associated with the footwear disclosed herein may be applied to a variety of athletic footwear types, including soccer shoes, baseball shoes, football shoes, golf shoes, and hiking shoes and boots, for example. Accordingly, the concepts disclosed herein apply to a wide variety of footwear types.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot.

The term "lateral axis," as used throughout this detailed description and in the claims, refers to an axis oriented in a lateral direction.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, and/or other joining techniques. In addition, two components may be "fixedly attached" by virtue of being integrally formed, for example, in a molding process.

Footwear Structure

FIG. 1 depicts an embodiment of an article of footwear 10, which may include a sole structure 12 and an upper 14 configured to receive a foot.

For reference purposes, footwear 10 may be divided into three general regions: a forefoot region 16, a midfoot region 18, and a heel region 20. Forefoot region 16 generally includes portions of footwear 10 corresponding with the toes and the joints connecting the metatarsals with the phalanges. Midfoot region 18 generally includes portions of footwear 10 corresponding with an arch area of the foot. Heel region 20 generally corresponds with rear portions of the foot, including the calcaneus bone. Regions 16, 18, and 20 are not intended to demarcate precise areas of footwear 10. Rather, regions 16, 18, and 20 are intended to represent general relative areas of footwear 10 to aid in the following discussion.

Since sole structure 12 and upper 14 both span substantially the entire length of footwear 10, the terms forefoot region 16, midfoot region 18, and heel region 20 apply not only to footwear 10 in general, but also to sole structure 12 and upper 14, as well as the individual elements of sole structure 12 and upper 14.

As shown in FIG. 1, upper 14 may include one or more material elements (for example, textiles, foam, leather, and synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. An ankle opening 22 in heel region 20 provides access to the interior void. In addition, upper 14 may include a lace 24, which may be utilized to modify the dimensions of the interior void, thereby securing the foot within the interior void and facilitating entry and removal of the foot from the interior void. Lace 24 may extend through apertures in upper 20, and a tongue portion 26 of upper 14 may extend between the interior void and lace 24. Upper 14 may alternatively implement any of a variety of other configurations, materials, and/or closure mechanisms. For example, upper 14 may include sock-like liners instead of a more traditional tongue; alternative closure mechanisms, such as hook and loop fasteners (for example, straps), buckles, clasps, cinches, or any other arrangement for securing a foot within the void defined by upper 14.

Sole structure 12 may be fixedly attached to upper 14 (for example, with adhesive, stitching, welding, and/or other suitable techniques) and may have a configuration that extends between upper 14 and the ground. Sole structure 12 may include provisions for attenuating ground reaction forces (that is, cushioning the foot). In addition, sole structure 12 may be configured to provide traction, impart stability, and/or limit various foot motions, such as pronation, supination, and/or other motions.

The configuration of sole structure 12 may vary significantly according to one or more types of ground surfaces on which sole structure 12 may be used, for example, natural turf (e.g., grass), synthetic turf, dirt, snow, synthetic rubber surfaces (e.g., running tracks) and other indoor surfaces. In addition, the configuration of sole structure 12 may vary significantly according to the type of activity for which footwear 10 is anticipated to be used (for example, running, hiking, soccer, baseball, football, and other activities).

Sole structure 12 may also vary based on the properties and conditions of the surfaces on which footwear 10 is anticipated to be used. For example, sole structure 12 may vary depending on whether the surface is harder or softer. In addition, sole structure 12 may be tailored for use in wet or dry conditions.

In some embodiments, sole structure 12 may be configured for a particularly specialized surface and/or condition. For example, in some embodiments, sole structure 12 may include a sole for a soccer shoe configured to provide traction and stability on soft, natural turf surfaces in wet conditions. In some such embodiments, sole structure 12 may include, for example, a low number of ground engaging members, wherein the ground engaging members are aggressively shaped, and having a relatively large size. Conversely, an alternative embodiment of sole structure 12 may be configured to provide traction and stability on hard, artificial turf surfaces in dry conditions. In some such embodiments, sole structure 12 may include, for example, a larger number of ground engaging members, which may be relatively smaller in size, and may have less aggressive shapes. While the number, size, and shape of ground engaging members are provided for exemplary purposes, other structural parameters may be varied in order to tailor the shoe for traction and stability on various surfaces, and/or in a variety of conditions. Additional such parameters may include, for example, the use of secondary traction elements, placement of ground engaging members, the relative softness or hardness of the ground engaging members and/or sole structure 12 in general, the relative flexibility of portions of sole structure 12, and other such parameters.

In some embodiments, sole structure 12 may be configured for versatility. For example, sole structure 12 may be configured to provide traction and stability on a variety of surfaces, having a range of properties, and/or under various conditions. For example, a versatile embodiment of sole structure 12 may include a medium number of ground engaging members, having a medium size and moderately aggressive shapes.

In addition to surface properties and conditions, sole structure 12 may also be configured based on the physical characteristics of the athlete anticipated to wear the footwear, and/or according to the type of activity anticipated to be performed while wearing the footwear. Football players, depending on the position they play, can have a wide range of physical characteristics and abilities. For example, linemen may be relatively heavy, relatively slower, but also much more powerful than players who play other positions. Linemen may place larger loads on a sole structure that may be sustained over longer durations, for example, up to one or two seconds, while engaging with opposing linemen.

In contrast, skilled player positions, such as wide receivers, may be relatively lighter weight, but much faster. Skilled player positions, may place more explosive and transient loads on a sole structure, via sprinting, cutting, and jumping, and thus, may also maintain those loads for only a relatively short duration (for example, a split second). Linebackers may have physical characteristics and abilities that represent a combination of the physical traits and abilities of linemen and wide receivers. While linebackers may possess speed and agility and operate in open field like a wide receiver, linebackers may also be larger, heavier, and more powerful, and also engage other players in tackling/blocking situations, like a lineman.

In view of the differing demands linemen and wide receivers may place on sole structures, sole structures most suitable for each type of player may be configured differently. For example, the sole structures of linemen shoes may be configured to be more stiff and durable, and also to distribute loads across the sole of the shoe. In contrast, wide receiver shoes may have sole structures that are configured for light weight, more selective flexibility and stiffness at different areas of the foot, fast ground penetration and egress by ground engaging members, and lateral responsiveness. Further, a sole structure configured for use by a linebacker may be more versatile, possessing compromises of strength, stiffness, stability, light weight, directional traction, and other characteristics.

Other types of activities may place similar and/or different demands on a sole structure of a shoe. For example, soccer athletes may place similar demands as wide receivers, that is, loads based on speed and agility. Thus, soul structures having light weight, responsiveness, fast ground penetration and egress, and traction in a variety of directions and at a variety of ground contact angles may be advantageous. In other sports, the demands may be more focused. For example, sole structures configured for use by track and field sprinters, who only run in a straight line at high speeds and accelerations, may be configured for light weight, straight line traction, and fast surface penetration and egress. In contrast, a sole structure configured for hiking may be configured quite differently. For example, a hiking sole structure may be configured to provide stability over uneven surfaces, protection from harsh surfaces (such as sharp rocks), traction on uphill and downhill slopes, and grip on a variety of surfaces, for example, natural turf, dirt, rocks, wood, snow, ice, and other natural surfaces that may be traversed by a hiker.

The accompanying figures depict various embodiments of cleated shoes, having sole structures suited for natural and/or synthetic turf. Although footwear 10, as depicted, may be suited for American football, such a cleated shoe may be applicable for use in other activities on natural and/or synthetic turf, such as baseball, soccer, and other such activities where traction and grip may be significantly enhanced by cleat members. In addition, various features of the disclosed sole structures (and/or variations of such features) may be implemented in a variety of other types of footwear.

In some embodiments, sole structure 12 may include multiple components, which may individually and/or collectively provide footwear 10 with a number of attributes, such as support, rigidity, flexibility, stability, cushioning, comfort, reduced weight, and/or other attributes. In some embodiments, sole structure 12 may include an insole 27, a midsole 28, and a ground engaging sole component 30, as shown in FIG. 1. In some cases, however, one or more of these components may be omitted.

Insole 27 may be disposed in the void defined by upper 14. Insole 27 may extend through each of regions 16, 18, and 20 and between the lateral and medial sides of footwear 10. Insole 27 may be formed of a deformable (for example, compressible) material, such as polyurethane foams, or other polymer foam materials. Accordingly, insole 27 may, by virtue of its compressibility, provide cushioning, and may also conform to the foot in order to provide comfort, support, and stability.

In some embodiments, insole 27 may be removable from footwear 10, for example, for replacement or washing. In other embodiments, insole 27 may be integrally formed with the footbed of upper 14. In other embodiments, insole 27 may be fixedly attached within footwear 10, for example, via permanent adhesive, welding, stitching, and/or another suitable technique.

In some embodiments of footwear 10, upper 14 may surround insole 27, including on an underside thereof. In other embodiments, upper 14 may not extend fully beneath insole 27, and thus, in such embodiments, insole 27 may rest atop midsole 28 (or atop chassis 100 in embodiments that do not include a midsole).

As noted above, footwear 10 is depicted in FIG. 1 as an American football shoe. Although football shoes often do not include a midsole, since many features of footwear 10 may be applicable to shoes that do include a midsole (including football shoes as well as shoes for other activities), the general location of midsole 28 has been depicted in FIG. 1 as it may be incorporated into any of a variety of types of footwear (including football shoes if they do include midsoles). Midsole 28 may be fixedly attached to a lower area of upper 14 (for example, through stitching, adhesive bonding, thermal bonding (for example, welding), and/or other techniques), or may be integral with upper 14. Midsole 28 may extend through each of regions 16, 18, and 20 and between the lateral and medial sides of footwear 10. In some embodiments, portions of midsole 28 may be exposed around the periphery of footwear 10. In other embodiments, midsole 28 may be completely covered by other elements, such as material layers from upper 14. Midsole 28 may be formed from any suitable material having the properties described above, according to the activity for which footwear 10 is intended. In some embodiments, midsole 28 may include a foamed polymer material, such as polyurethane (PU), ethyl vinyl acetate (EVA), or any other suitable material that operates to attenuate ground reaction forces as sole structure 12 contacts the ground during walking, running, or other ambulatory activities.

Ground Engaging Sole Component

An article of footwear according to the present disclosure may include a sole structure including a ground engaging sole component fixedly attached to the bottom portion of the upper. The sole component may include features that provide traction and stability on any of a variety of surfaces, and in any of a variety of conditions.

The sole component may be formed by any suitable process. For example, in some embodiments, the sole component may be formed by molding. In addition, in some embodiments, various elements of the sole component may be formed separately and then joined in a subsequent process. Those having ordinary skill in the art will recognize other suitable processes for making the sole components discussed in this disclosure.

The sole component may include a baseplate and one or more ground engaging members extending downward from the baseplate. The baseplate may include a substantially flat element that supports the foot, and serves as a substantially rigid platform from which the ground engaging members may extend.

Materials

The disclosed footwear components may be formed of any suitable materials. In some embodiments, one or more materials disclosed in Lyden et al. (U.S. Pat. No. 5,709,954), which is hereby incorporated by reference in its entirety, may be used.

The components of the disclosed baseplate may be formed of any of a variety of suitable materials. In some embodiments the baseplate, the ground engaging members, and other elements of the sole component may be integrally formed. For example, in some embodiments, the entirety of the sole component may be formed of a single material, forming all parts of the sole component. In such embodiments, the sole component may be formed all at once in a single molding process, for example, with injection molding.

Different structural properties may be desired for different aspects of the sole component. Therefore, the structural configuration may be determined such that, even though a common material is used for all portions of the sole component, the different portions may be stiffer, or more flexible due to different shapes and sizes of the components. For example, the heel and midfoot regions of the baseplate may be formed of a thicker material and/or may include reinforcing features, such as ribs, in order to provide stiffness to these portions of the sole component, whereas the forefoot region of the baseplate, particularly a region of the baseplate corresponding with the ball of the foot, may be formed of a relatively thin material, in order to provide flexibility to the forefoot region. Greater flexibility in a forefoot region may enable natural flexion of the foot during running or walking, and may also enable the sole component to conform to surface irregularities, which may provide additional traction and stability on such surfaces. In addition, the ground engaging members may be formed with a thicker structure to provide rigidity and strength.

In other embodiments, different portions of the sole component may be formed of different materials. For example, a stiffer material, such as carbon fiber, may be utilized in the heel and/or midfoot regions of the baseplate, whereas a more flexible material, such as a thin polyurethane, may be used to form the forefoot region of the baseplate. In addition, it may be desirable to utilize a stiffer and/or harder material for the baseplate, such as carbon-fiber and/or polyurethane, and softer and more flexible material for the ground engaging members, such as a relatively hard rubber. Accordingly, in some embodiments, the sole component may be formed by multiple molding steps, for example, using a co-molding process. For instance, the baseplate may be pre-molded, and then inserted into a sole component mold, into which the ground engaging member material may be injected to form the ground engaging members, or portions of the ground engaging members. In other embodiments, the ground engaging members may be pre-molded and the baseplate may be co-molded with the pre-formed ground engaging members. In addition, other components of the baseplate, such as reinforcing elements, may be formed of different materials. For example, reinforcing strips may be formed of different materials than portions of the baseplate adjacent the reinforcing strips. Further details regarding reinforcing strips and exemplary materials for reinforcing strips are discussed below.

Sole component 30 may be formed of suitable materials for achieving the desired performance attributes. Sole component 30 may be formed of any suitable polymer, rubber, composite, and/or metal alloy materials. Exemplary such materials may include thermoplastic and thermoset polyurethane (TPU), polyester, nylon, glass-filled nylon, polyether block amide, alloys of polyurethane and acrylonitrile butadiene styrene, carbon fiber, poly-paraphenylene terephthalamide (para-aramid fibers, e.g., Kevlar®), titanium alloys, and/or aluminum alloys. In some embodiments, sole component 30, or portions of sole component 30, may be formed of a composite of two or more materials, such as carbon-fiber and poly-paraphenylene terephthalamide. In some embodiments, these two materials may be disposed in different portions of sole component 30. Alternatively, or additionally, carbon fibers and poly-paraphenylene terephthalamide fibers may be woven together in the same fabric, which may be laminated to form sole component 30. Other suitable materials and composites will be recognized by those having skill in the art.

Baseplate

Figure 2:
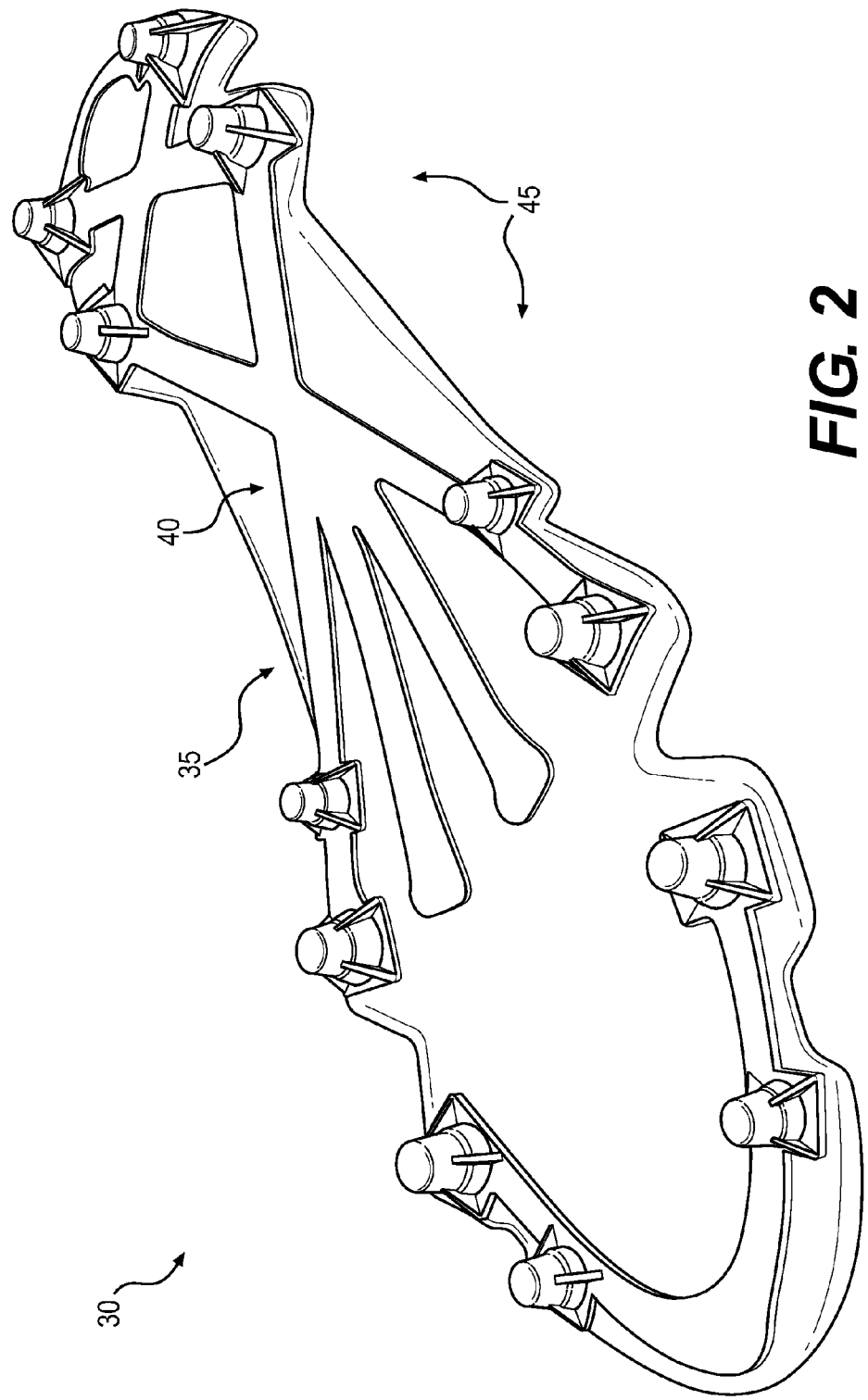
FIG. 2 is a schematic illustration of a lower perspective view of an exemplary ground engaging sole component.

FIG. 2 is a bottom perspective view of an exemplary embodiment of ground engaging sole component 30 configured to be fixedly attached to an upper in order to form an article of footwear. As shown in FIG. 2, sole component 30 may include a baseplate 35. Baseplate 35 may be a substantially flat, plate-like platform. Baseplate 35, although relatively flat, may include various anatomical contours, such as a relatively rounded longitudinal profile, a heel portion that is higher than the forefoot portion, a higher arch support region, and other anatomical features. In addition, baseplate 35 may include a bottom surface 40, which may be generally flat, but may have various contours that provide stiffness, strength, and/or traction. Exemplary such structures are discussed in greater detail below.

Ground Engaging Members

Sole component 30 may include one or more ground engaging members 45 to provide traction and/or stability. It will be understood that a variety of types of ground engaging members could be implemented by sole component 30. Sole component 30 may include ground engaging members having any of a variety of shapes, sizes, and arrangements based on a number of factors. The configuration of ground engaging members utilized for sole component 30 may be based on the considerations discussed above, for example, the physical attributes of the player, the nature of the surface on which the activity is performed, and the conditions of that surface.

In some cases, ground engaging members 45 could be configured to engage a soft ground surface. For example, in one embodiment, ground engaging members 45 could be configured to engage a soft grass surface. In other cases, ground engaging members 45 could be configured to engage a hard surface. For example, in one embodiment ground engaging members 45 could be configured to engage a hard grass surface or artificial turf. In still other embodiments, other types of ground engaging members could be used.

The ground engaging members may be configured to provide traction and stability on any of a variety of surfaces, and in under any of a variety of surface conditions. As depicted in FIG. 2, sole component 30 equipped with ground engaging members 45 is a versatile sole structure, which may be suitable for a variety of surfaces. For example, the ground engaging members shown in the accompanying figures may be suited for a variety of relatively soft surfaces, such as natural or cushioned synthetic turf, relatively soft-packed dirt, and other compliant surfaces. However, the features shown and discussed in the present disclosure may also be applicable for relatively hard surfaces where cleated shoes may be utilized. Exemplary such surfaces may include, for example, relatively un-cushioned synthetic turf, hard-packed dirt or cinders, such as may be found on a baseball field or a running track, or synthetic rubber, such as may be found on other types of running tracks.

Further, sole component 30 could be configured for any of various types of users, surfaces, and/or conditions, sole component 30 (and other presently disclosed sole component embodiments). For example, sole component 30 may be configured for speed and agility, and may be suitable for lighter weight athletes demonstrating, or looking to improve, speed and quickness. Alternative, sole component 30 may be configured for stability and support. As shown in the accompanying figures, sole component 30 is configured as a sole for an American football shoe. However, such a sole configuration, either as shown or with minor modifications, could be utilized for other activities, such as baseball, soccer, and/or other activities.

Exemplary disclosed ground engaging members may have one or more features that facilitate ground penetration and/or ground extraction. Such features may include, for example, shapes, sizes, positioning on the sole component, as well as the orientation of the ground engaging members. For example, in some embodiments, the ground engaging members may have an elongate cross-sectional horizontal shape. In other embodiments, the cross-sectional shape may be circular. In some embodiments, ground engaging members may have different shapes in different portions of the sole component. For example, elongate cleats may be provided in one portion of the sole component to provide directional traction and circular in another portion of the sole component to provide similar traction in all directions.

Although the present disclosure discusses circular ground engaging members in detail, it will be understood that disclosed concepts such as support members and a reinforcing shank arrangement may be implemented with ground engaging members having any suitable cross-sectional shape.

Circular ground engaging members may be less costly to produce, and may also provide relatively even traction in all horizontal directions. Circular engaging members may also provide traction, and still allow rotation of a foot about the circular ground engaging member while in contact with the ground. This may facilitate pivoting on a planted foot, which may, in turn, enable rapid changes in direction by the athlete, and promote freedom of motion. For instance, a round ground engaging member may be disposed in a region of the sole component associated with a first metatarsal head, which may facilitate pivoting about this region of the foot while the ground engaging member remains penetrated into the ground, thus maintaining grip during the pivot.

While ground engaging members having a substantially circular cross-sectional shape may have a consistent diameter, and thus, a substantially cylindrical overall form, in some embodiments, ground engaging members may have a tapering cross-sectional shape. For example, ground engaging members 45 may be wider proximate bottom surface 40 of baseplate 35 and narrower toward the tip 47 of the ground engaging member 45. Ground engaging members having a circular cross-sectional shape may taper by virtue of having a substantially conical or frustoconical shape. The narrower tip of a ground engaging member may provide increased ground penetration, and may facilitate rapid egress of ground engaging members from the turf. It will be understood that non-circular ground engaging members, such as elongate ground engaging members may taper in length and/or width with distance from baseplate 35.

As shown in FIG. 2, ground engaging members 45 may have a substantially circular cross-sectional shape. In some embodiments, ground engaging member 45 may be substantially conical or frustoconical, as shown in FIG. 2. Substantially circular ground engaging members may be utilized at any suitable location of a sole component. In some embodiments, substantially circular ground engaging members may be disposed at a region of the sole component corresponding with the first metatarsal head region of the wearer's foot and/or at the region of the foot corresponding with the distal portion of the first phalanx. An athlete may place a significant amount of their weight on these regions of their foot when pivoting. Therefore, placement of substantially circular ground engaging members at these locations may facilitate pivoting, while still maintaining traction.

In some embodiments, the ground engaging members may include additional features that may provide increased ground penetration. For example, in some embodiments, the ground engaging members may include a stepped cross-sectional shape. That is, the ground engaging members may transition, at a step, from a larger diameter upper portion to a smaller diameter lower portion. Such a stepped configuration may be implemented on ground engaging members having any suitable shape, including ground engaging members having a conical or frustoconical shape. Like conical and frustoconical shapes, the stepped configuration provides increased ground penetration by utilizing a narrower lower tip, while providing a stable and sturdy base by utilizing a wider upper portion.

In addition, in some playing conditions, the stepped configuration may provide additional benefits. For example, in some conditions it may be desirable to limit the amount of ground penetration, for example in order to facilitate speed of egress of the ground engaging members from the playing surface. The step may provide a shoulder-type surface that limits the penetration of the ground engaging members into certain playing surfaces, such as relatively firm grass surfaces. Rather than utilizing a ground engaging member with a shorter overall height to limit ground penetration, utilizing a stepped ground engaging member may provide a more versatile ground engaging member configuration. For example, a stepped ground engaging member may provide desirable performance by limiting ground penetration into certain surfaces (such as hard surfaces discussed above) and, in addition, a stepped ground engaging member may also provide deeper penetration into other types of surfaces, such as soft and/or wet surfaces, on which it may be desirable to provide increased ground penetration.

Figure 3:
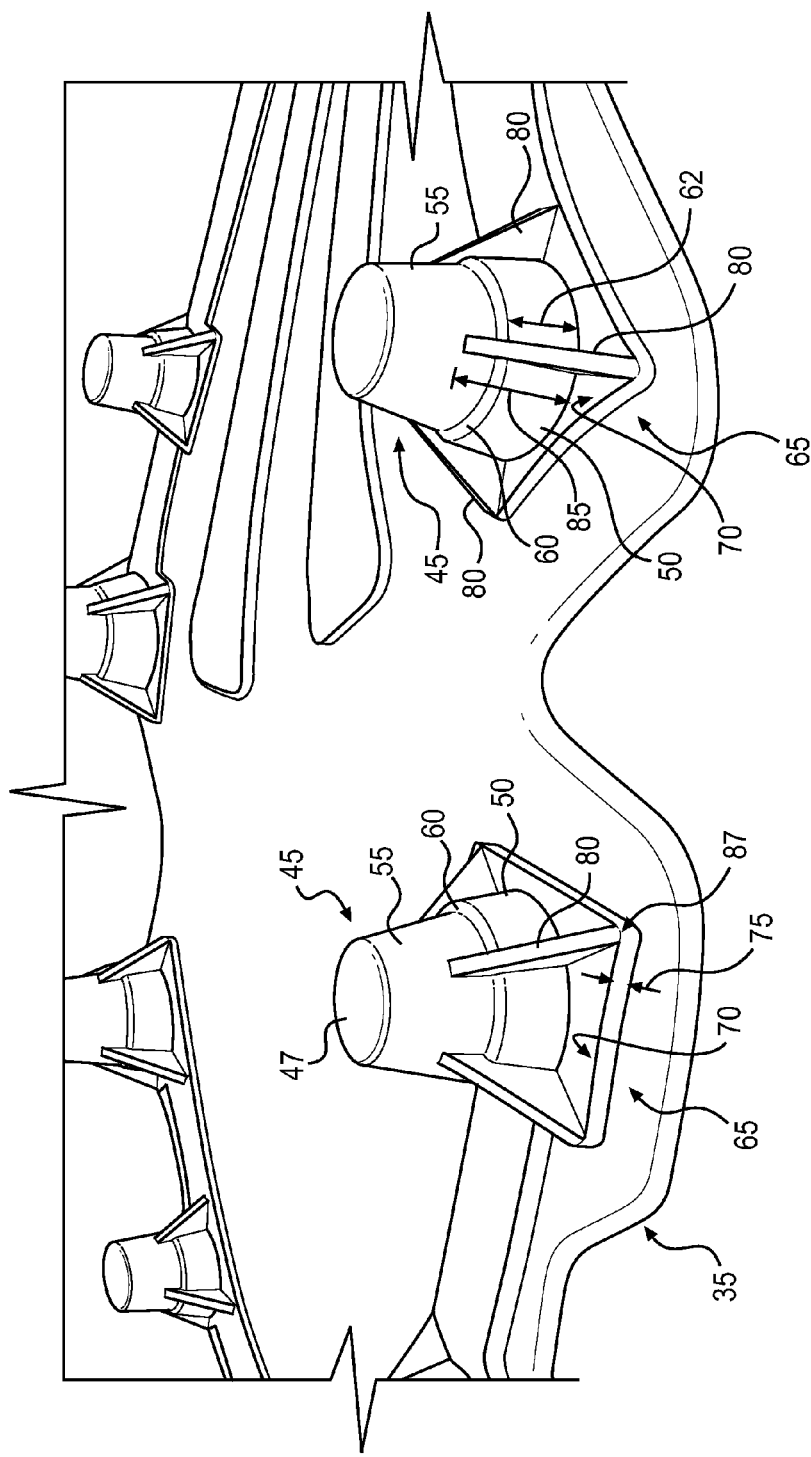
FIG. 3 is a schematic illustration of an enlarged bottom perspective view of a portion of the sole component shown in FIG. 2.

As shown in FIG. 3, ground engaging members 45 may extend substantially downward from bottom surface 40 of baseplate 35. As further shown in FIG. 3, ground engaging member may having a stepped cross-sectional size with an upper portion 50 of ground engaging member 45 having a larger cross-sectional size than a lower portion 55 of ground engaging member 45. The transition between upper portion 50 and lower portion 55 forming a step 60.

As shown in FIG. 3, in some embodiments, step 60 may have a substantially frustoconical configuration. In addition, in some embodiments, step 60 may have slightly rounded surfaces between step 60 and upper portion 50 and/or between step 60 and lower portion 55. Slightly rounded transitions of step 60 may lessen the extent to which the stepped configuration may limit ground penetration. In addition, the slightly rounded transitions may also prevent or inhibit the collection of soil and debris on step 60, thereby limiting the amount of weight-adding material that collects on sole component 30 during the course of play.

In some embodiments, the baseplate may include additional features that provide strength and stability to the ground engaging member/baseplate assembly. For example, in some embodiments, the baseplate may include a plurality of platforms upon which the ground engaging members may be mounted. Such platforms provide strength and stability by adding material to the baseplate at the portions of the baseplate to which the ground engaging members are attached. This may provide additional strength and stiffness to the baseplate, as well as to the connection between the baseplate and the ground engaging members. Further, as discussed in greater detail below, the platforms may provide a reinforced mounting surface to which support members extending from the ground engaging members may be attached.

As shown in FIG. 3, in some embodiments, bottom surface 40 of baseplate 30 may include a plurality of platforms, such as substantially square platforms 65, each platform 65 having a lower surface 70 having a ground engaging member 45 extending downward from lower surface 70. Although platforms 65 are shown and discussed in the present disclosure as being substantially square, platforms 65 may have any suitable shape.

As shown in FIG. 3, platforms 65 may be defined by portions of baseplate 35 that extend downward. Thus, platforms 65 may have a thickness 75. Platforms 65 may have any suitable thickness 75. For example, in some embodiments, thickness 75 may be in the range of approximately 0.5 mm to approximately 5.0 mm. Although other suitable thicknesses may be suitable.

In some embodiments, platforms 65 may be formed by the same material as other portions of baseplate 35. In other embodiments, platforms 65 may be formed of a material that is different than portions of baseplate 35 adjacent to platforms 65. Further, platforms 65 may be formed of the same or different material than ground engaging members 45. Thus, depending on the materials used, platforms 65 may be formed in various ways, such as molding, co-molding, adhesive bonding, welding, or any other suitable process of producing a baseplate with such platform structures.

In some embodiments, lower surfaces 70 of platforms 65 may be substantially planar. In some embodiments, lower surfaces 70 of one or more of platforms 65 may be curved, for example in a convex manner, in order to conform to contours of baseplate 35. For example, in some embodiments, lower surfaces 70 of platforms 65 may be curved upward at peripheral edges of baseplate 35. This may enable ground engaging members 45 extending from platforms 65 to be located as close as possible to the peripheral edge of baseplate 35, which may provide stability, as well as increased traction when baseplate 35 interfaces with the ground at non-zero angle (that is, when the wearer's foot is tilted with respect to the ground).

Support Members

In addition to ground engaging members, a ground engaging sole component may include one or more features to provide reinforcement to the ground engaging members, increase traction, and facilitate ground penetration and extraction. In some embodiments the ground engaging sole component may include one or more elongate support members extending downward from the bottom surface of the baseplate of the sole component, abutting the side portions of the ground engaging members, and extending horizontally from the ground engaging member.

As shown in FIG. 3, sole component 30 may include a plurality of elongate support members 80. Support members 80 may extend substantially downward from baseplate 35 and may abut side portions of ground engaging members 45. The shape, size, and arrangement of support members may vary significantly. Additional examples of such elongate support members are disclosed in co-pending U.S. application Ser. No. 13/009,549, filed Jan. 19, 2011, entitled "Composite Sole Structure;" Ser. No. 12/582,252, filed Oct. 20, 2009, entitled "Article of Footwear with Flexible Reinforcing Plate;" Elongate support members may have any shape or configuration, including any of the various embodiments described in one or more of co-pending U.S. application Ser. No. 13/234,180, filed on Sep. 16, 2011, entitled "Shaped Support Features For Footwear Ground-Engaging Members," U.S. application Ser. No. 13/234,182, filed on Sep. 16, 2011, entitled "Orientations For Footwear Ground-Engaging Member Support Features," U.S. application Ser. No. 13/234,183, filed on Sep. 16, 2011, entitled "Spacing For Footwear Ground-Engaging Member Support Features," and U.S. application Ser. No. 13/234,185, filed on Sep. 16, 2011, entitled "Sole Arrangement With Ground-Engaging Member Support Features." The disclosures of all of these applications are hereby incorporated herein by reference in their entirety.

The amount of reinforcement provided by the elongate support members may be dependent on the shape, size (length, height, thickness), material, placement, and or orientation of the support members. The amount of reinforcement provided may also depend on the number of support members used on each ground engaging member. The foregoing parameters may be varied to achieve the desired level of reinforcement for a given ground engaging member. In some cases, weight may be reduced by using a thinner, lighter weight ground engaging member, while the strength and stiffness of the ground engaging member may be maintained by the inclusion of one or more elongate support members, which may provide the same amount of strength and stiffness using less material.

Similarly, the reduction of material from the ground engaging members may increase ground penetration. For example, the cross-section of the ground engaging members may be reduced, allowing for increased ground penetration. The addition of the support members provides little, if any, additional impedance to ground penetration because the support members are relatively thin, and thus readily penetrate the ground. In addition, the support members may be configured such that they do not extend the full height of the ground engaging members, thus, a significant portion of the ground engaging members may penetrate the ground before the support members even engage the ground. Also, the support members may have a sloped configuration, which may also facilitate ground penetration of the support members themselves.

In addition to reinforcement and ground penetration, the elongate support members may provide increased traction. As additional elements that extend from the bottom surface of the sole component baseplate, the support members may serve as secondary traction elements. In addition, because the support members may be elongate, the traction provided, like the reinforcement, is substantially directional. That is, an elongate support member provides the most traction in a direction perpendicular to the direction in which it is elongated. Thus, the orientation of each elongate support member may be selected to provide traction in a desired direction at a desired region of the ground engaging sole component. Accordingly, additional traction may be provided specifically in a longitudinal (forward-rearward) direction or a lateral (lateral-medial) direction, or at any angle between longitudinal and lateral. It is noted that the direction in which an elongate support member provides the most reinforcement is perpendicular to the direction in which it provides the most traction. This factor may be considered when selecting support member configurations.

By extending one or more elongate support members substantially radially (or at other angles) from a ground engaging member, torsional traction may be provided about the ground engaging member. Torsional traction is a characteristic that may be either desirable or undesirable depending on the application. For example, for certain activities, it may be beneficial to have greater freedom of motion. Accordingly, for such activities, a reduced size and/or number of support members may be utilized at regions of the foot that may serve as pivot points during the activity. For other activities, it may be desirable to provide increased torsional traction in order to increase performance. For example, it may be advantageous to provide a baseball shoe with increased torsional traction at certain portions of the foot, in order to enable a batter to generate more torque by twisting his body during a swing.

In some cases, it may be advantageous to provide increased torsional traction on one foot, and to provide decreased torsional traction on the other foot. For example, while a baseball player may want additional torsional traction at one or more portions of his rear foot (away from the pitcher) to enable him to execute a more powerful swing, he may want a reduced amount of torsional traction at one or more portions on his front foot (closer to the pitcher), to enable greater freedom of motion. Depending on the portion of the foot in question, the opposite may also be true. That is, it may be desirable to provide one or more portions of the rear foot with a reduced amount of torsional traction and provide one or more portions of the front foot with an increased amount of torsional traction. Accordingly, asymmetric sole components may be provided for left and right feet. That is, the left foot sole component may be a non-mirror image of the right foot sole component.

Torsional traction systems may be advantageous for any type of activity where it would be beneficial to generate torque with the body. For example, increased agility may be provided by enabling increased torque to be generated when changing directions. In addition, other exemplary such activities may involve asymmetric motions, such as throwing, swinging, kicking, and other motions. Therefore, exemplary applications where torsional traction systems could be implemented may include, for example, golf, baseball (for hitting as noted above, as well as throwing), American football (throwing by quarterback), javelin, and soccer (kicking).

The foregoing outlines a multitude of parameters regarding the structural configuration of support members that may be manipulated to provide desired reinforcement, ground penetration, and traction characteristics at specific locations of the sole of an article of footwear. Accordingly, the shape, size, material, placement, orientation, and other specifications of each individual support member may be chosen to achieve the desired performance characteristics. This customization of multiple components of a cleat system is reflected in the asymmetric and irregular support member configurations in the disclosed embodiments. It is noted that the shape, size, orientation, and other parameters of support members may be inconsistent among ground engaging members in the same sole structure embodiment. Further, it should also be noted that, such variation may also exist among support members about a common ground engaging member.

Sizing of Support Members

As discussed above, the sizing of a support member may have a significant effect on the amount of reinforcement, ground penetration and extraction, and traction provided by the support member. Accordingly, the sizing of each support member may be selected according to considerations discussed above in order to achieve desired performance characteristics.

The height of support members is one dimension that is a factor in the ultimate size of support members. In some embodiments the height of support members may be similar or the same as the height of the ground engaging member to which the support members are abutted (a configuration not shown in the accompanying figures). In other embodiments, the height of support members may be shorter than the height of the ground engaging member to which the support members are abutted. For example, in some embodiments, support members may extend downward from the bottom surface of the baseplate less distance than the first ground engaging member extends downward from the bottom surface of the baseplate. Such a configuration may facilitate ground penetration and/or ground extraction of the ground engaging members due to the periphery of the ground engaging members being unencumbered by additional elements at the tip portions of the ground engaging members. The difference between the height of the support members and the height of the ground engaging members may be selected in order to achieve desired performance, such as desired levels of reinforcement, ground penetration and extraction, and/or traction.

As shown in FIG. 3, support members 80 may have substantially the same size about a common ground engaging member 45. For example, all support members abutting the same ground engaging member may have substantially the same height. Although the embodiments illustrated in the accompanying figures show support members about a common ground engaging member to have substantially the same heights, it is envisaged that certain embodiments may implement arrangements of support members wherein the heights of support members about a common ground engaging member are inconsistent.

As shown in FIG. 3, support members 80 may have a support member height 85. In some embodiments, support members 80 may extend downward more than half the height of the ground engaging member to which the support members are abutted. In some embodiments support members 80 may extend downward half the height, or less than half of the height, of the first ground engaging member.

In some embodiments, the elongate support members may project downward from the baseplate and extend below the step in the cross-section of the ground engaging member. For example, in some embodiments, height 85 of support members 80 may be longer than a height 62 of upper portion 50 of ground engaging members 80 (between baseplate 35 and step 60). In some embodiments, such elongate support members may extend downward from the bottom surface of the baseplate less than the full height of the ground engaging members.

In some embodiments, elongate support members may extend proximate to, or completely to the edge of corners of the baseplate platforms from which the ground engaging members extend. For example, as shown in FIG. 3, support members 80 may attach to lower surface 70 of substantially square platforms 65 proximate corners 87 of platforms 65. This configuration may maximize the horizontal extension of the elongate support members while minimizing the amount of extra material utilized for the platforms. In some embodiments, support members 65 may extend completely to the edge of corners 87 of platforms 65, as shown in FIG. 3.

Orientation of Support Members

While the amount of reinforcement, ground penetration, and/or traction may be controlled by varying the shape of the support members, the direction in which the reinforcement and traction may be provided may also be controlled. Each elongate support member may provide reinforcement and traction in multiple directions. However, due to the elongate structure, each elongate support member may provide the most reinforcement in the direction of its elongation. For example, an elongate support member that extends medially from a ground engaging member may provide the greatest reinforcement in the lateral and medial directions. Such a support member may, additionally, provide reinforcement in forward and rearward directions, albeit to a lesser degree. Thus, the direction of reinforcement provided by the elongate support members may be controlled by selecting the orientation of the support member. Similarly, the direction of greatest traction provided by support members may be substantially perpendicular to the direction of elongation.

In some embodiments, one or more support members may extend substantially radially from an approximate center portion of a ground engaging member. In some embodiments, one or more support members may extend in a substantially non-radial direction. In some embodiments, all support members abutting the same ground engaging member may extend radially from the ground engaging member. In some embodiments, all support members abutting the same ground engaging member may extend in a substantially non-radial direction. Further, in some embodiments, both radially and non-radially oriented support members may abut the same ground engaging member.

Figure 4:
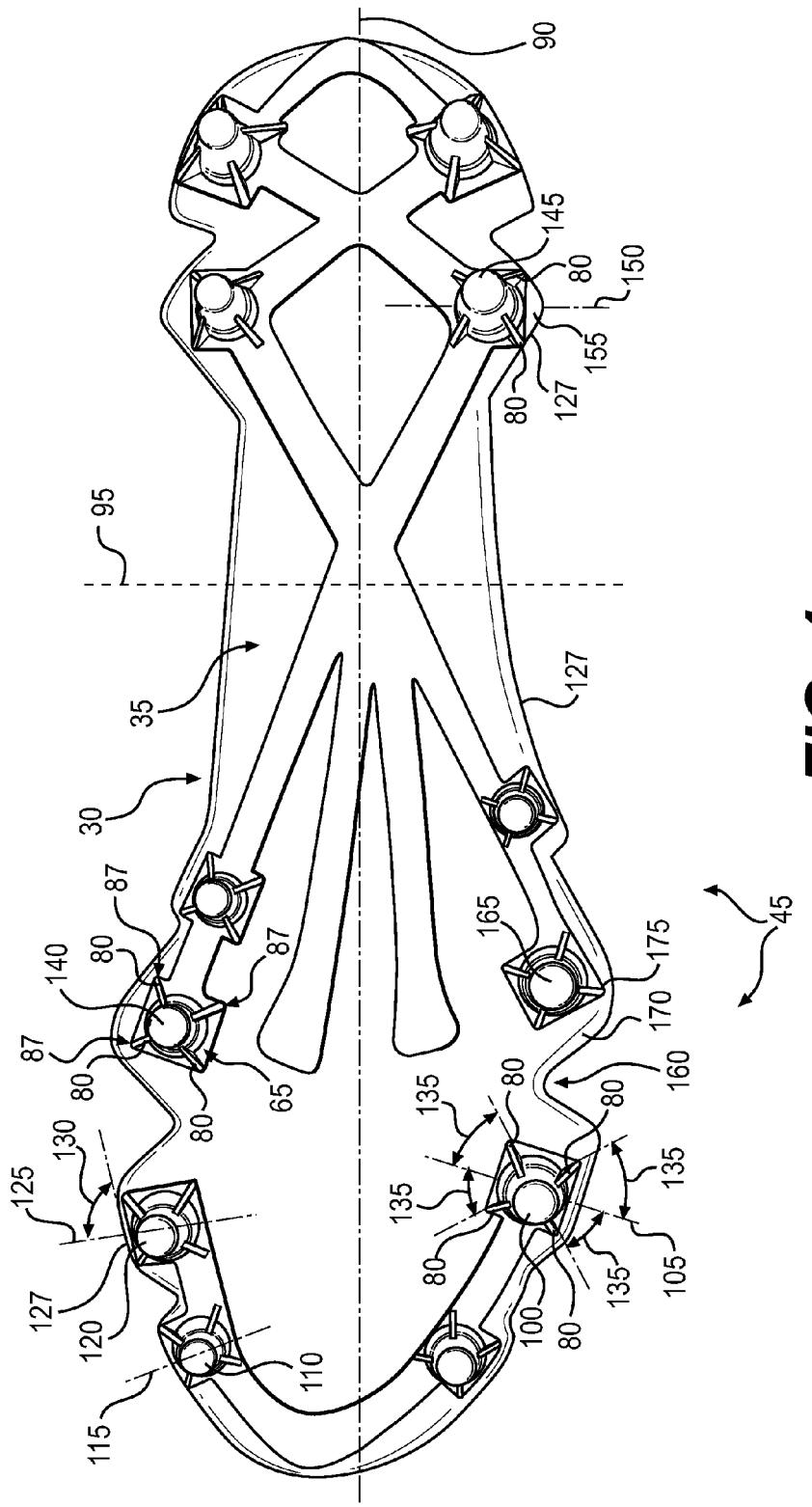
FIG. 4 is a schematic illustration of a bottom view of the sole component shown in FIG. 2.

In some embodiments, all support members abutting the same ground engaging member may be radially oriented. As shown in FIG. 4, one or more of support members 80 may extend substantially radially from an approximate center portion of the ground engaging member 45 from which the support member 80 extends. In some embodiments, all of support members 80 may be substantially radially oriented with respect to the ground engaging members 45 from which the support members 80 respectively extend. As also shown in FIG. 4, elongate support members 80 may be disposed on opposite sides of ground engaging member 45, in substantial alignment with each other.

As shown in FIG. 4, one or more of support members 80 may be independent of any other ground engaging members extending from baseplate 35. As used in this detailed description and in the claims, the term "independent," shall refer to a lack of interaction and/or connection of an elongate support member with a ground engaging member other than the ground engaging member to which it abuts. Further, the term "independent" shall also refer to the lack of interaction and/or connection of an elongate support member with any other support members abutting another ground engaging member. In addition, as illustrated in the accompanying figures, the spaces between elongate support members may be devoid of additional support members.

As further shown in FIG. 4, sole component 30 (and baseplate 35) may have a longitudinal axis 90 and a lateral axis 95. Longitudinal axis 90 may extend in a lateral direction, as defined herein. Longitudinal axis 90 may be located along a substantially central portion of sole component 30 between the lateral and medial sides of sole component 30, and thus, may be referred to as a central axis or central, longitudinal axis. However, the lateral location of longitudinal axis 90 may vary. Lateral axis 95 may extend in a lateral direction as defined herein. Lateral axis 95 may be longitudinally located in any suitable location along the length of sole component 30. Longitudinal axis 90 and lateral axis 95 are referred to herein primarily as reference points for purposes of discussing features related to the orientation of the elongate support members.

In some embodiments, the baseplate may include additional features that may provide stability, support, and/or strength to the sole component. For example, in some embodiments, the baseplate may include a plurality of ground engaging members located about a periphery of the baseplate. Locating ground engaging members farther toward the peripheral edge of the baseplate provides a wider base upon which the soul component contacts the ground, thereby providing a more stable configuration. In order to enable the ground engaging members to be located as far outboard as possible, while still having a plurality of evenly spaced elongate support members abutting the ground engaging members, the elongate support members may be oriented at angles with respect to the peripheral edge of the baseplate. Orienting elongate support members perpendicular to the peripheral edge of the baseplate would require the ground engaging members to which such support members are abutted to be located farther inboard in order to leave enough space for the elongate support members between the ground engaging members and the peripheral edge of the baseplate. Accordingly, the elongate support members may be oriented at an angle with respect to the peripheral edge, for example, approximately 45 degrees. In other words, the elongate support members may be in substantial non-alignment with an axis that is perpendicular to the peripheral edge of the baseplate and passes through the ground engaging members to which the support members are respectively abutted. With the elongate support members oriented at such an angle, the ground engaging members may be located as far outboard as desired, including configurations where the ground engaging members extend all the way to the peripheral edge of the baseplate and embodiments where the ground engaging members are minimally spaced (for example by approximately 1-3 mm) from the peripheral edge of the baseplate.

In addition to being angled with respect to the peripheral edge of the baseplate, the elongate support members may also be oriented in directions suitable for providing desired performance for predetermined sporting movements. For example, support, strength, and traction may be desired in certain directions for an American football shoe. In order to provide such directional characteristics, the elongate support members may be arranged in asymmetric and/or irregular orientations. For example, certain elongate support members, sets of elongate support members, or even all elongate support members of a sole component may be oriented in a substantially non-parallel orientation with respect to the longitudinal axis and/or the lateral axis of the baseplate.

FIG. 4 illustrates exemplary configurations of elongate support members 80 oriented at angles with respect to the peripheral edge 127 of baseplate 35. For example, in some embodiments three or more ground engaging members may be abutted by elongate support members that are oriented at angles with respect to peripheral edge 127 and also oriented in a substantially non-parallel orientation with respect to longitudinal axis 90 and lateral axis 95. In some embodiments a substantial majority, and in some cases all, of elongate support members 80 of sole component 30 may be oriented in this fashion.

As shown in FIG. 4, ground engaging members 80 may include a first ground engaging member 100 having a first ground engaging member axis 105 passing through member 100 and oriented substantially perpendicular to peripheral edge 127 of baseplate 35 proximate to member 100. Ground engaging members 80 may also include a second ground engaging member 110 having a second ground engaging member axis 115 passing through member 110 and oriented substantially perpendicular to peripheral edge 127 of baseplate 35 proximate to member 110. In addition, ground engaging members 80 may further include a third ground engaging member 120 having a third ground engaging member axis 125 passing through member 120 and oriented substantially perpendicular to peripheral edge 127 of baseplate 35 proximate to member 120. The substantially perpendicular orientation of axes 105, 115, and 125 with respect to peripheral edge 127 is illustrated by a substantially right angle 130 shown in FIG. 4 using third ground engaging member 120 as an example.

FIG. 4 also illustrates that angles 135 between support members 80 and axes 105, 115, and 125 may be substantially the same. For example, as shown in FIG. 4, angles 135 corresponding with support members 80 abutting first ground engaging member 100 may be oriented at substantially the same angle relative to axis 105.

As also shown in FIG. 4, support members 80 abutting first, second, and third ground engaging members 100, 110, and 120 may also be oriented in a substantially non-parallel orientation with respect to longitudinal axis 90 and lateral axis 95.

FIG. 4 further shows a fourth ground engaging member 140. As discussed above with respect to FIG. 3, elongate support members 80 may extend to corners 87 of base platforms 65. As shown in FIG. 4, in some embodiments, each elongate support member 80 abutting a common ground engaging member, such as ground engaging member 140 may extend to corners 87 of base platform 65. Accordingly, in some embodiments, the spacing about a ground engaging member may be substantially the same between all support members abutting that ground engaging member.

A fifth ground engaging member 145 is also shown by FIG. 4, and may have a fifth ground engaging member axis 150. As shown in FIG. 4, in some embodiments, peripheral edge 127 of baseplate 35 may have curvatures and other irregularities. Elongate support members 80 disposed proximate such a curved portion of peripheral edge 127 may be oriented any suitable way to achieve desired performance characteristics. In some embodiments, support members 80 may be oriented at different angles with respect to peripheral edge 127 as compared to the support members abutting first through fourth ground engaging members 100, 110, 120, and 140, due to the irregular curvature of peripheral edge 127 proximate fifth ground engaging member 145. Accordingly, support members 80 abutting fifth ground engaging member 145 may be oriented similarly with respect to the overall peripheral area of baseplate 35 as support members 80 abutting first through fourth ground engaging members 100, 110, 120, and 140. Thus, support members 80 abutting fifth ground engaging member 145 may be oriented at substantially the same angle relative to axis 150, which may be oriented substantially parallel to lateral axis 95 in some embodiments, as shown in FIG. 4. It should be noted that projection 155 of baseplate 35 shown in FIG. 4 may extend generally upward, for example wrapping around the lower edge of the foot. (See FIG. 1.) Therefore, as shown in FIG. 4, projection 155 may extend in a lateral direction only minimally.

In some embodiments, the baseplate may have gaps or cutouts in the plate in order to allow different regions of the baseplate to flex in certain ways. It may be desirable, however, to maintain strength and rigidity in the baseplate portions that are adjacent to the gaps. In some embodiments, elongate support members may be oriented in such a manner that, not only do the support members reinforce ground engaging members to which the support members are abutted, but they may also reinforce regions of the ground engaging sole component baseplate adjacent to a gap in the baseplate.

As shown in FIG. 4, sole component 30 may have a first gap 160 and a sixth ground engaging member 165 adjacent to a protruding portion 170. In some embodiments, an elongate support member 175, abutting sixth ground engaging member 165, may extend into protruding portion 170 in order to provide reinforcement (strength and/or rigidity). Such baseplate reinforcement may be provided by elongate support members in any portions of the baseplate, including portions that are near gaps in the baseplate, as well as portions that are relatively distanced from gaps.

Materials of Support Members

Suitable materials for forming ground engaging sole components are described above. As noted above, different components of the sole components may be formed of the same or different materials. In some embodiments, at least one of a plurality of support members abutting a common ground engaging member may be formed of the same material as at least a portion of the ground engaging member. This may facilitate the molding process of the ground engaging sole components. In other embodiments, the support members may be formed of a different material than the ground engaging member to which the support members are abutted. For example, it may be desirable to provide a support member that is substantially more rigid than the ground engaging member. With such a configuration, rigidity can be selectively provided to different aspects of the ground engaging member, in similar ways that the positioning, orientation, shape, and size of support members may selectively alter the performance characteristics of ground engaging members.

Further, in some embodiments, different portions of the same ground engaging member may be formed of different materials. For example, a ground engaging member may be formed of one material in portions where support members abut the ground engaging member, and may be formed of a different material in portions where support members do not abut the ground engaging member. In some embodiments, upper portions of ground engaging members, where support members are abutted, may be formed of a first material, whereas lower portions of ground engaging members, below the step and/or below the downward-most portions of support members, may be formed of a different material. The selection of these materials may be based on the performance characteristics of the materials in terms of providing strength, rigidity, ground penetration and extraction, and traction. In some embodiments the lower portions (e.g., tip portions) of ground engaging members may be formed of relatively softer materials (e.g., hard rubber) than upper portions of the ground engaging members. This may improve traction on various surfaces, and may also resist wear on non-playing surfaces (e.g., pavement) before and after participating in the activities for which the footwear is suited.

Reinforcing Shank Arrangement

In some embodiments, the sole component may include features that provide reinforcement to stiffen portions of the baseplate and/or to stiffen the mounting points of ground engaging members in a select manner. For example, in some embodiments, the sole component may include a reinforcing shank arrangement. The shank arrangement may include a plurality of reinforcing strips incorporated into the baseplate. In some embodiments, the reinforcing strips may be formed of a different material than other adjacent portions of the baseplate.

Figure 5:
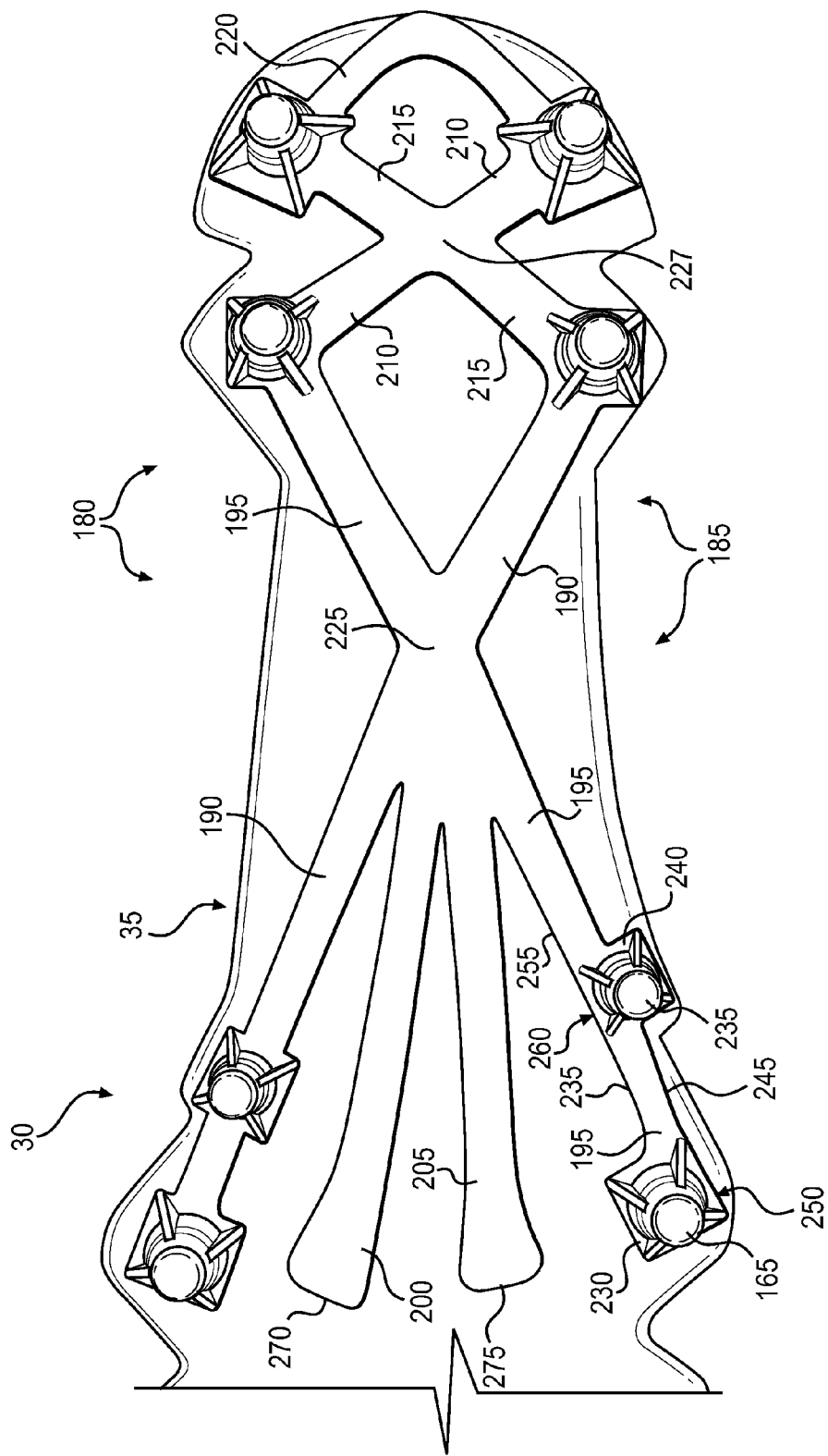
FIG. 5 is a schematic illustration of a partial bottom view of the sole component shown in FIG. 2.

FIG. 5 illustrates a partial bottom view of sole component 30. As shown in FIG. 5, baseplate 35 of sole component 30 may include a reinforcing shank arrangement 180. Reinforcing shank arrangement 180 may include, for example, a plurality of reinforcing strips 185. For example, shank arrangement 180 may include a first X strip 190 and a second X strip 195, which may be arranged in an X-configuration. Also, baseplate 35 may include a first intermediate strip 200 and a second intermediate strip 205. Baseplate 35 may also include a first heel X strip 210 and a second heel X strip 215, also arranged in an X-configuration. Further, baseplate may include a substantially U-shaped heel strip 220. The arrangement of these strips will be discussed below in greater detail.

Shape of Reinforcing Shank Strips

The reinforcing strips may have any suitable shape. The shape and form of the reinforcing strips may be selected to provide stiffness, reinforcement, strength, stability, resiliency, and other such characteristics. In some embodiments, the strips may have rectangular cross sections. For example, the strips may be relatively flat structures extending from the bottom of the baseplate (for example 1-3 mm thick). In other embodiments, the strips may be fully or partially embedded in the baseplate. For example, in some embodiments, the strips may be flush with portions of the bottom surface of the baseplate.

Association with Cleat Studs and Cleat Bases/Platforms

In some cases, it may be desirable to provide reinforcement in a region of the sole component in which traction has a lower priority. Therefore, in some embodiments, at least one of the reinforcing strips may be independent of ground engaging members. For example, with ground engaging members disposed about the periphery of the baseplate, it may be preferred to omit ground engaging members from a central (inboard) portion of the baseplate in order to save weight. However, it may still be desired to provide reinforcement in the central region. Accordingly, in some embodiments, first intermediate strip 200 and second intermediate strip 205 may be independent of ground engaging members, as shown in FIG. 5.

In some embodiments, one or more reinforcing strips may extend independent of other reinforcing strips. For example, as shown in FIG. 5, first intermediate strip 200 may terminate at a free end 270 independent of ground engaging members and independent of other reinforcing strips. Similarly, second intermediate strip 205 may also terminate at a free end 275 independent of ground engaging members and independent of other reinforcing strips.

In some embodiments, reinforcement may be desired at the connection points of ground engaging members. Accordingly, one or more of reinforcing strips 185 may form at least a portion of a base platform (for example platform 240) from which at least one of the ground engaging members (for example a seventh ground engaging member 235) may extend. In some embodiments, the reinforcing strip may be pre-molded integrally with the base platform and/or the ground engaging member. In some embodiments, the reinforcing strip may be formed separately than the base platform and/or separately than the ground engaging member. For example, the base platform and/or ground engaging member may be pre-formed and then co-molded with the reinforcing strip. In other embodiments, the reinforcing strips may be integrally molded with base platforms and ground engaging members.

In some cases, the edge of a base platform may be aligned (flush or substantially flush) with the side edge of a reinforcing strip. For example, in some embodiments, the strip may form a portion of the platform, and thus, the side edge of the strip may form the side edge of the platform. Such a configuration with aligned edges may minimize crevasses in which soil may become trapped, adding unwanted weight to the footwear. Such configurations may also provide benefits in terms of easier manufacturing, as well as strength.

In some embodiments a single reinforcing strip may be associated with more than one ground engaging member. For example, in some cases, a reinforcing strip may adjoin the base platforms of two ground engaging members. In some embodiments, one side of the adjoining strip may be flush with a first edge of a first of the two base platforms, and an opposite side of the adjoining strip may be flush with an edge of a second of the two base platforms opposite the first edge of the first platform. Such a configuration may provide reinforcement in a desired portion of the baseplate along a path that may not coincide with a line extending more directly between the adjacent ground engaging members, while at the same time, maintaining flush edges on at least one side of each platform in order to minimize crevasses and improve manufacturing as discussed above.

Figure 6:
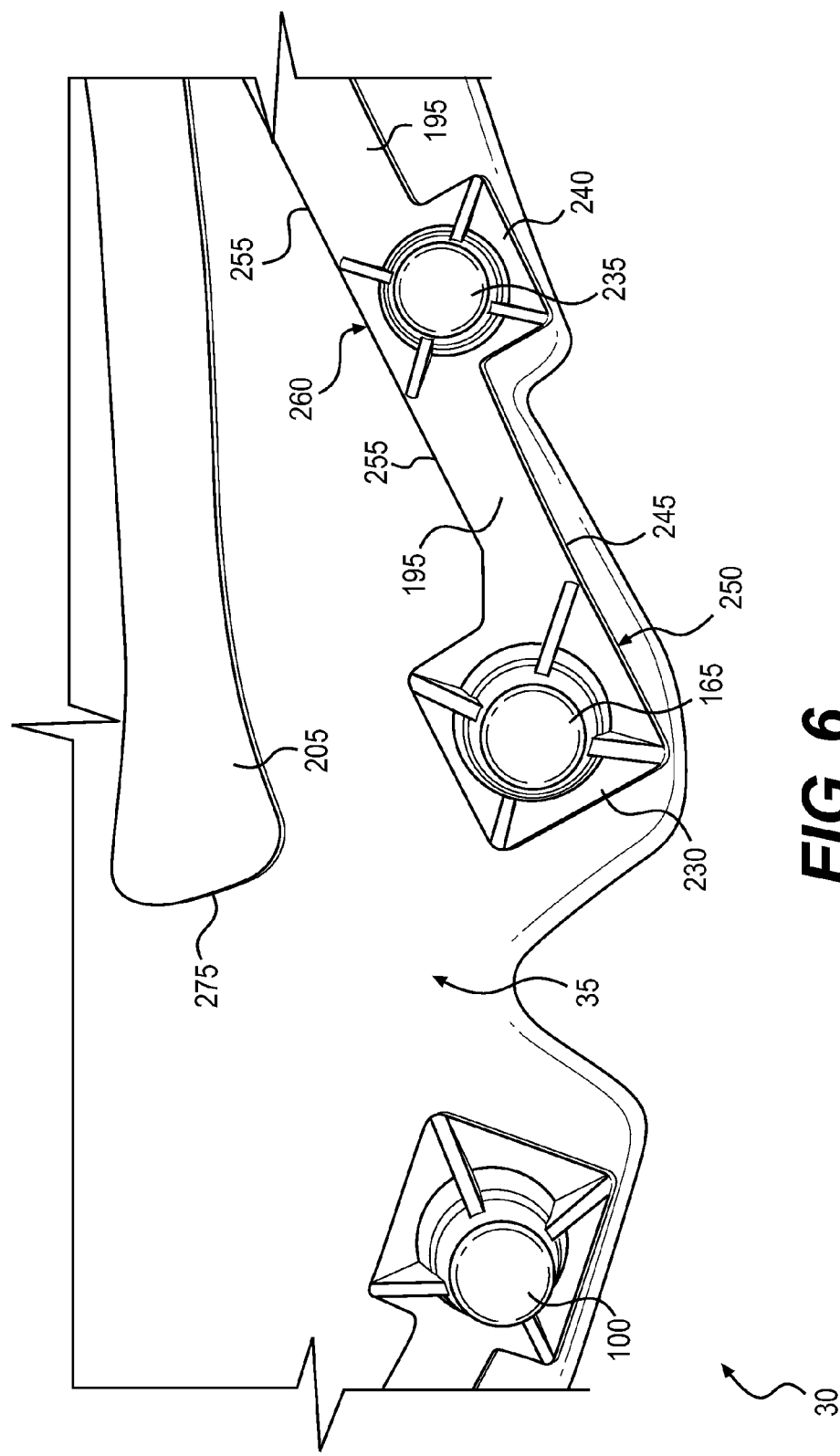
FIG. 6 is a schematic illustration of another partial bottom view of the sole component shown in FIG. 2.

FIG. 6 is an enlarged view of a portion of sole component 30. As shown in FIG. 6, sixth ground engaging member 165 may extend from a base platform 230. In addition, a seventh ground engaging member 235 may extend from a base platform 240. Platform 230 may have a platform edge 250 that may be substantially flush with a first side edge 245 of strip 195. In addition, an opposite side edge 255 of strip 195 may be substantially flush with a platform edge 260 of platform 240.

In other cases, the base platforms may extend beyond the side edge of the reinforcing strip on one or both sides of the strip. Such a configuration may be suitable when the strips are relatively narrow relative to the size of the platforms. For example, strip 195 is flush with only one edge of each of platforms 230 and 240. Platforms 230 and 240 are both wider than strip 195 and thus both extend beyond strip 195 on one side.

X-Configurations

In some embodiments, the baseplate may include features that provide torsional rigidity and reinforcement. For example, in some embodiments, one or more pairs of reinforcing strips may be arranged in an X-configuration. Such a configuration may provide torsional reinforcement and strength.

Figure 7:
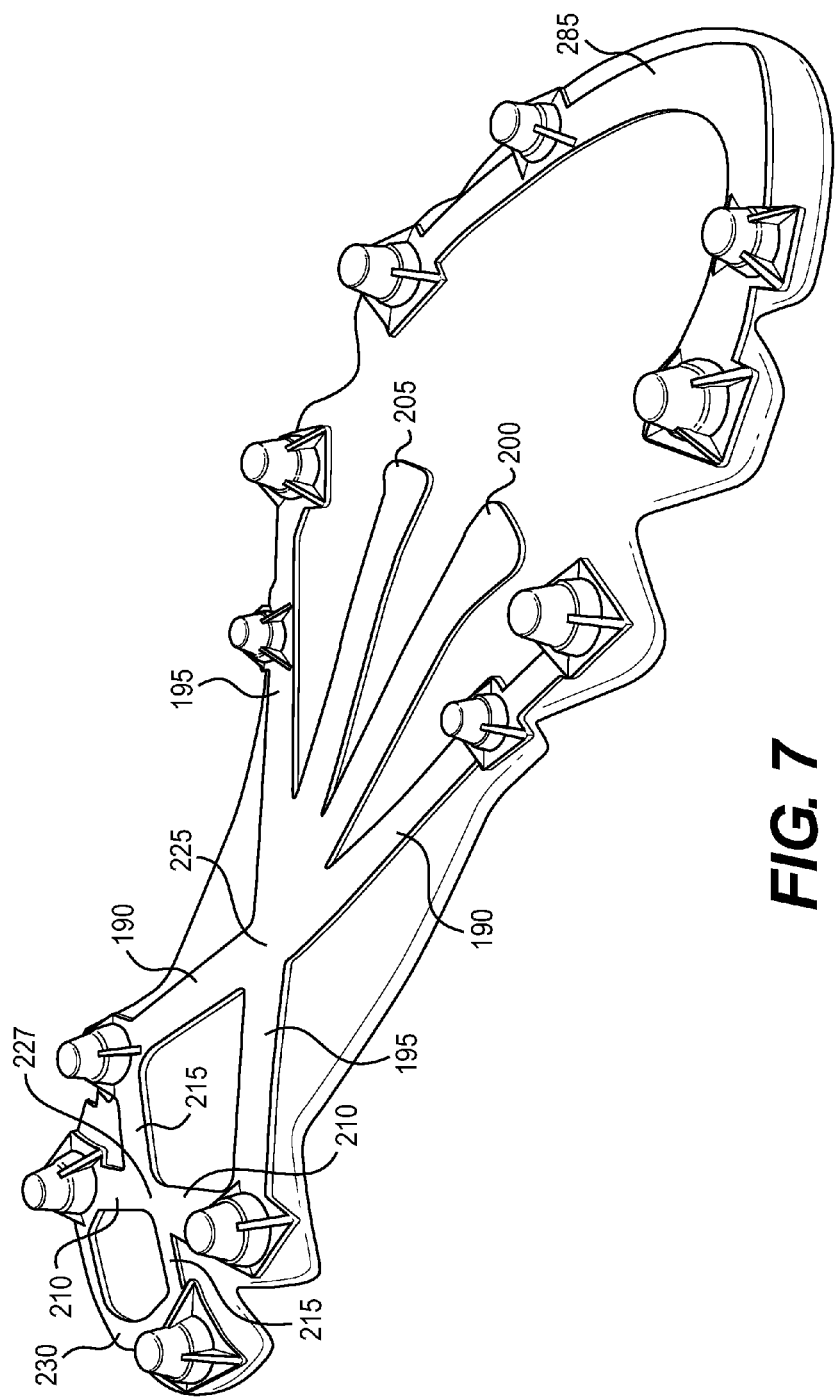
FIG. 7 is a schematic illustration of another lower perspective view of FIG. 2 is a schematic illustration of a lower perspective view of an exemplary ground engaging sole component.

As shown in FIG. 7, first X strip 190 and second X strip 195 may be arranged to cross at an intersection 225 in an X-configuration. As further shown in FIG. 7, both first X strip 190 and second X strip 195 may extend between base platforms associated with ground engaging members. In addition, reinforcing shank arrangement 180 may further include first intermediate strip 200 and second intermediate strip 205 extending from intersection 225 between first X strip 190 and second X strip 195. As shown in FIG. 7, first intermediate strip 200 and second intermediate strip 205 may be independent of ground engaging members.

In addition, as also shown in FIG. 7, first heel X strip 210 and second heel X strip 215 may be arranged to cross at an intersection 227 to form an X-configuration. This X-configuration may extend between base platforms with ground engaging members to provide reinforcement and torsional rigidity to the ground engaging members in the heel region of sole component 30 and to the heel region in general.

Front and Rear U-Shaped Strips

In some embodiments, one or more reinforcing strips may be located along the peripheral edge of the baseplate. For example, substantially U-shaped reinforcing strips may be located in the toe and heel portions of he baseplate. In some embodiments, these U-shaped strips may be associated with base platforms and ground engaging members. Such U-shaped strips may provide reinforcement and rigidity in areas of the baseplate that are subjected to relatively high levels of loading and abrasion. In addition, the U-shape may provide increases in torsional rigidity.

As shown in FIG. 7, baseplate 35 may include substantially U-shaped heel strip 220, which may be associated with ground engaging members in the heel region and may also interact with the X-configuration formed by first heel X strip 210 and second heel X strip 215. In addition, baseplate 35 may include a substantially U-shaped toe strip 285. U-shaped toe strip 285 may extend along peripheral edge 127 of baseplate 35 and may be associated with ground engaging members in the forefoot region of baseplate 35.

Flexible Ball of the Foot

In some embodiments, reinforcing strips may be selectively located on baseplate to provide not only reinforcement and rigidity, but also to permit flexibility in certain portions of the baseplate. For example, while it may be desirable to provide the heel and midfoot portions of the baseplate with substantial rigidity, it is often desirable to provide at least a portion of the forefoot region with a substantial amount of flexibility. For example, it may be desirable to provide the baseplate with a substantially flexible region corresponding with the ball of the foot. The toe region of the baseplate may be reinforced, while maintaining a flexible region between the relatively rigid toe region and the relatively rigid midfoot region of the baseplate. This flexible region may be provided by providing only minimal reinforcement in this region or by omitting reinforcing strips from this region altogether.

Figure 8:
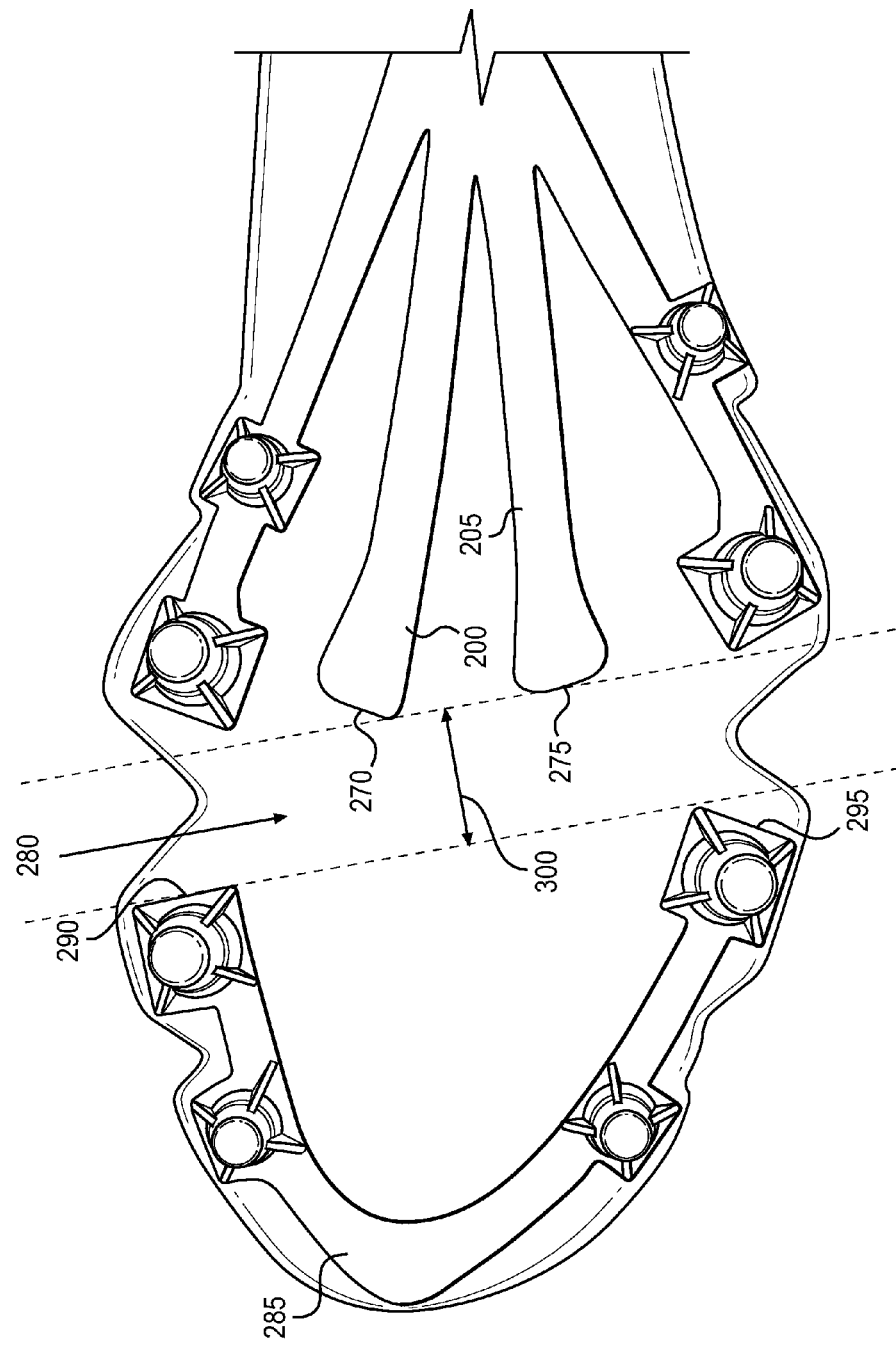
FIG. 8 is a schematic illustration of another partial bottom view of the sole component shown in FIG. 2.

As shown in FIG. 8, U-shaped toe strip 285 may extend from a forward-oriented apex to a first free end 290 and a second free end 295 oriented in a rearward direction. In addition, first intermediate strip 200 and second intermediate strip 205 may respectively terminate in free ends 270 and 275. In some embodiments, free ends 270 and 275 may terminate in a region 280 corresponding with the ball of the foot. For example, free ends 270 and 275 may terminate in a region corresponding with the distal metatarsal heads of the foot. In addition, free ends 270 and 275 may terminate at locations that are further rearward than free ends 290 and 295 of U-shaped toe strip 285. This may provide an unreinforced region of sole component 30, as indicated by a dimension 300 in FIG. 8.

As shown in FIG. 8, in some embodiments, free ends 270 and 275 of first and second intermediate strips 200, 205 may be flared in a lateral direction. This may provide additional reinforcement in the forefoot region, which may be wider than other regions of the baseplate.

Method of Making/Materials

As noted above, various components of the disclosed sole components may be formed simultaneously, or separately and then joined by one or more co-molding processes, for example involving injection molding. The disclosed reinforcing strips may be made by any suitable reinforcing material, such as glass-filled nylon, carbon fiber, or other such reinforcing materials. Such materials may be relatively light weight and may have a relatively high tensile strength and/or overall durability.

Tapered Support Structures

In some embodiments, the sole component may include support structure partially surrounding substantially circular ground engaging members. Such support structure may have a non-circular cross sectional shape. In some embodiments, the support structure may have a tapered configuration, such as a substantially pyramidal shape. For example, in some embodiments, an exemplary tapered support structure may have the shape of a triangular pyramid.

The triangular pyramid may have a substantially triangular base abutting the bottom surface of the sole component and may extend downward and taper toward an outer surface of the substantially circular ground engaging member. The triangular base may have three vertices and three side edges extending from the vertices at an angle toward the sidewall of the substantially circular ground engaging member. This provides a traction element having a tip portion with a substantially circular cross-sectional shape, and an upper portion having a polygonal (for example triangular) cross-sectional shape. The polygonal shape provides directional traction, that is, traction that has varying characteristics in different directions. The side edge areas provide traction and support in a similar way as the elongate support members discussed above. Accordingly, the size, shape, and/or orientation of the tapered support structure can be altered to tune the sole component for varying amounts of traction and support in varying directions and locations.

Figure 9:
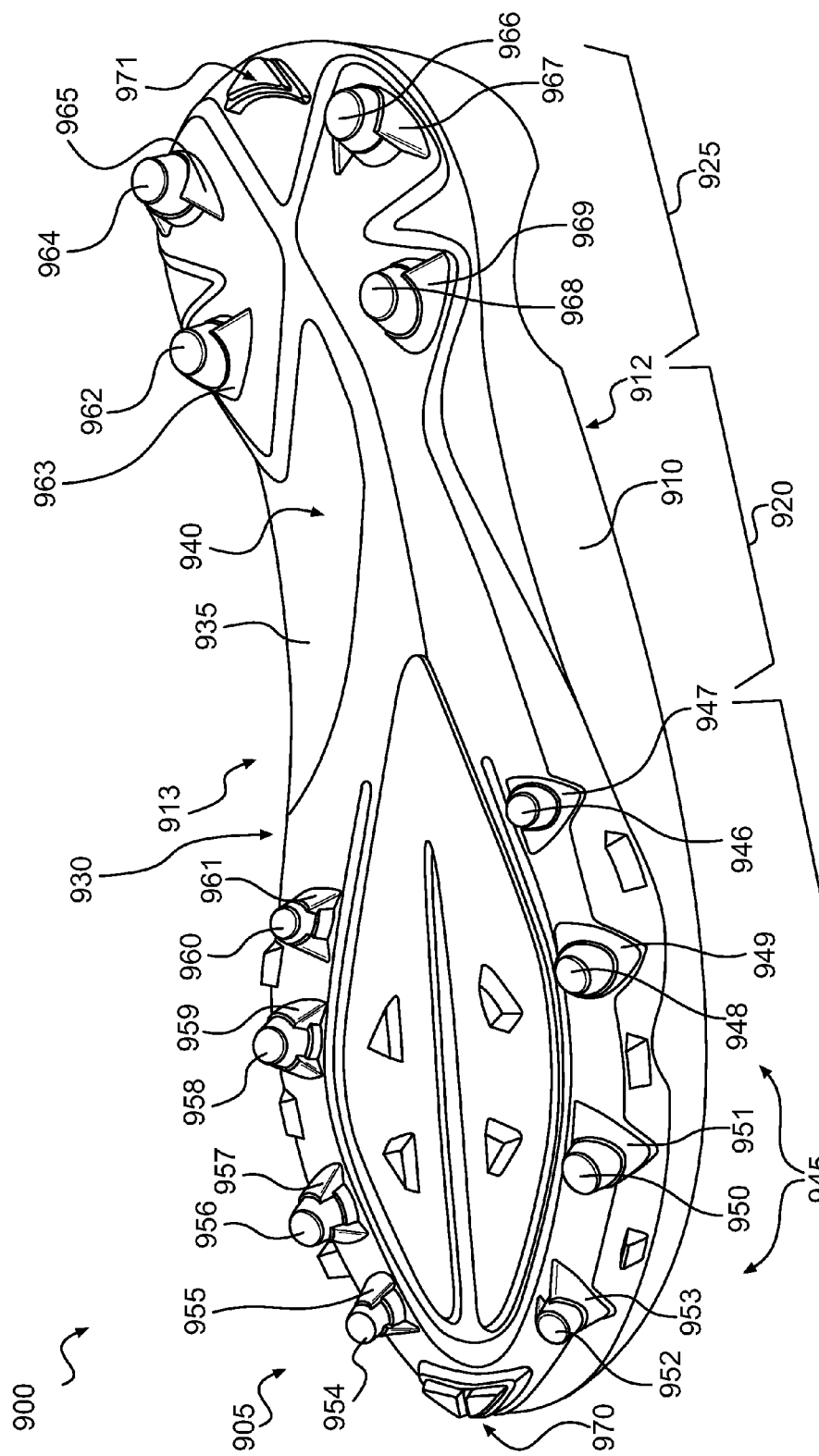
FIG. 9 is a schematic illustration of an article of footwear having another exemplary sole structure.

FIG. 9 illustrates an article of footwear 900 having a sole structure 905 fixedly attached to a bottom portion of an upper 910. Footwear 900 may have a lateral side 912 and a medial side 913. In addition, footwear 900 may include a forefoot region 915, a midfoot region 920 and a heel region 925.

Sole structure 905 of footwear 900 may include a ground-engaging sole component 930. Sole component 930 may include a baseplate 935 having a bottom surface 940. In addition, sole component 930 may include one or more ground engaging members 945 extending substantially downward from bottom surface 940 of baseplate 935. Ground engaging members 945 may have any suitable shape. In some embodiments, ground engaging members 945 may have a substantially circular cross-sectional shape. For example, as shown in FIG. 9, ground engaging members 945 may have a substantially frustoconical shape. In some embodiments, ground engaging members 945 may be substantially cylindrical.

As shown in FIG. 9, sole component 930 may include a first ground engaging member 946, which may be associated with a first pyramidal support structure 947. In addition, sole component 930 may include a second ground engaging member 948 and an associated pyramidal support structure 949, a third ground engaging member 950 and an associated third pyramidal support structure 951, a fourth ground engaging member 952 and an associated fourth pyramidal support structure 953, a fifth ground engaging member 954 and an associated fifth pyramidal support structure 955, a sixth ground engaging member 956 and an associated sixth pyramidal support structure 957, a seventh ground engaging member 958 and an associated seventh pyramidal support structure 959, a eighth ground engaging member 960 and an associated eighth pyramidal support structure 961. As shown in FIG. 9, these ground engaging members and support structures may be located in forefoot region 915 of sole component 930.

As also shown in FIG. 9, sole component 930 may further include a ninth ground engaging member 962 and an associated ninth pyramidal support structure 963, a tenth ground engaging member 964 and an associated tenth pyramidal support structure 965, a eleventh ground engaging member 966 and an associated eleventh pyramidal support structure 967, and a twelfth ground engaging member 968 and an associated twelfth pyramidal support structure 969. As shown in FIG. 9, these ground engaging members and support structures may be located in heel region 925 of sole component 930.

In some embodiments, sole component 930 may also include additional ground engaging members. For example, as shown in FIG. 9, sole component 930 may include a toe region ground engaging member 970. Toe region ground engaging member 970 may provide increased traction in one or more directions. For example, as shown in FIG. 9, toe region ground engaging member 970 may be elongated in a lateral direction and, thereby, provide traction in a longitudinal direction. Toe region ground engaging member 970 may provide increased traction, particularly for forward acceleration, where an athlete is leaning forward onto the forefoot region 915 and toe region of footwear 900. In some embodiments, sole component 930 may include a heel region ground engaging member 971. As shown in FIG. 9, heel region ground engaging member 971 may be elongated in a lateral direction and, thereby, provide traction in a longitudinal direction, for example, during deceleration, when the athlete's heel strikes the ground before, and with significantly more force than, midfoot region 920 and forefoot region 915.

Figure 10:
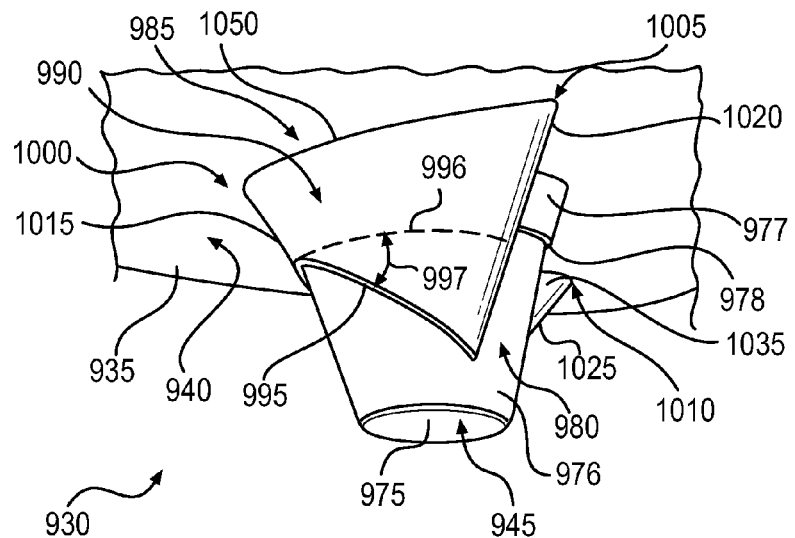
FIG. 10 is an enlarged perspective view of a ground engaging member of the sole structure shown in FIG. 9.

FIG. 10 illustrates an enlarged perspective view of a ground engaging member 945. As shown in FIG. 10, ground engaging member 945 may have a substantially frustoconical shape terminating in a substantially circular tip 975. Ground engaging member 945 may also have a lower portion 976, and an upper portion 977. In some embodiments, lower portion 976 and upper portion 977 may have differing cross-sectional sizes. For example, as shown in FIG. 10, ground engaging member 945 may have a step 978 in a sidewall 980 of ground engaging member formed by the transition between lower portion 976 and upper portion 977 of ground engaging member.

FIG. 10 also illustrates an exemplary pyramidal support structure 985. Pyramidal support structure 985 may have a substantially triangular pyramidal shape extending substantially downward from bottom surface 940 of baseplate 935 of sole component 930. Pyramidal support structure may abut ground engaging member 945 at a side portion (that is on sidewall 980). Further, as shown in FIG. 10, pyramidal support structure 985 may partially surround ground engaging member 945.

By at least partially surrounding ground engaging member 945, pyramidal support structure 985 may provide strength and rigidity to ground engaging member 945. By only partially surrounding ground engaging member 945, pyramidal support structure 985 may provide traction and/or support in selective directions. For example, a side of ground engaging member 945 that is not surrounded by pyramidal support structure 985 may be oriented in a direction in which the ground engaging member is subjected to relatively lower loads. By omitting material from a portion of the pyramidal structure, weight may also be saved.

As shown in FIG. 10, pyramidal support structure 985 may extends downward from baseplate 935 less than ground engaging member 945. However, in some embodiments, pyramidal support structure 985 may extend downward from baseplate 935 below step 978 in the cross-section of ground engaging member 945.

As also shown in FIG. 10, pyramidal support structure 985 may include a sidewall 990, which intersects sidewall 980 of ground engaging member 945 at a junction 995. In some embodiments, junction 995 may be a relatively smooth transition between sidewall 980 and sidewall 990. In some embodiments, junction 995 may have a small step or ridge, as shown in FIG. 10. It will be noted that sidewall 990 of pyramidal support structure 985 may be angled substantially similar to sidewall 980 of ground engaging member 945. Thus, in some embodiments, sidewall 990 may be substantially parallel to portions of sidewall 980. In some embodiments, however, sidewall 990 may be angled differently than sidewall 980. For example, sidewall 980 may be more vertical than sidewall 990.

As shown in FIG. 10, a triangular pyramidal support structure 985 may include a substantially triangular base where pyramidal support structure 985 abuts baseplate 935. The substantially triangular base may include a first vertex 1000, a second vertex, 1005, and a third vertex 1010. Pyramidal support structure 985 may further include a first side edge 1015 extending from first vertex 1000 to sidewall 980 of ground engaging member 945, a second side edge 1020 extending from second vertex 1005 to sidewall 980 of ground engaging member 945, and a third side edge 1025 extending from third vertex 1010 to sidewall 980 of ground engaging member 945.

In some embodiments, the junction (at step 978) between side wall 980 and sidewall 990 may be non-horizontal. For example, in some embodiments, sidewall 990 of pyramidal support structure 985 extends lower proximate to the exposed portion (between second side edge 1020 and third side edge 1025) of ground engaging member 945 than on an opposite side of ground engaging member 45 (proximate first side edge 1015). This may be due to an off-center positioning of pyramidal support structure 985 with respect to ground engaging member 945. Such configurations are discussed in greater detail below.

Figure 11:
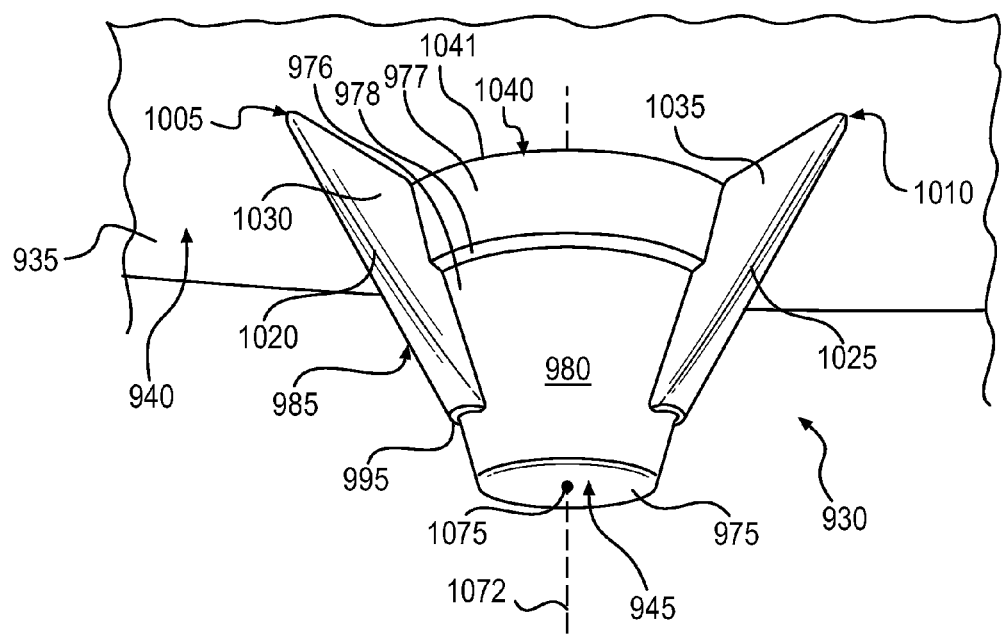
FIG. 11 is another enlarged perspective view of a ground engaging member of the sole structure shown in FIG. 9.

FIG. 11 illustrates the same ground engaging member 945 shown in FIG. 10 turned 90 degrees relative to the view shown in FIG. 10. As illustrated in FIG. 11, pyramidal support structure 985 may extend more than half way around a circumference of ground engaging member 945. Pyramidal support structure may include a first radial wall 1030 extending from second side edge 1020 substantially radially inward to side wall 980 of ground engaging member 945, and a second radial wall 1035 extending from third side edge 1025 substantially radially inward to side wall 980 of ground engaging member 945. Thus, the exposed portion of ground engaging member 945 is a portion of side wall 980 between first radial wall 1030 and second radial wall 1035.

As also illustrated in FIG. 11, ground engaging member 945 may have a substantially circular base 1040 where ground engaging member 945 abuts baseplate 935. Substantially circular base 1040 may include a substantially circular base edge 1041, as shown in FIG. 11.

Figure 12:
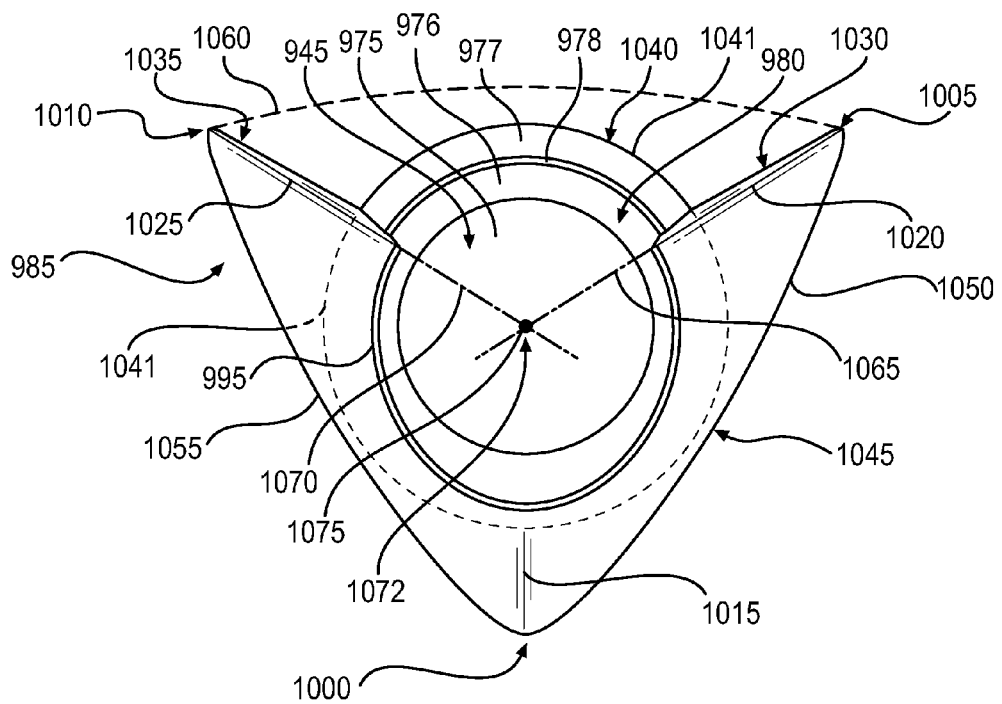
FIG. 12 is an enlarged bottom view of the ground engaging member shown in FIGS. 10 and 11.

FIG. 12 illustrates a bottom view of ground engaging member 945 and pyramidal support structure 985. Substantially circular base 1040 and base edge 1041 are shown in the area between first radial wall 130 and second radial wall 1035. In addition, base edge 1041 is shown in phantom where it is hidden under pyramidal support structure 985. In some embodiments, pyramidal support structure 985 may be a separate piece of material attached to ground engaging member 945. In other embodiments, however, pyramidal support structure 985 may be formed as a single, unitary structure with ground engaging member 945. For example, the two components may be molded as one piece, or two separate pieces may be co-molded, thus melding the two pieces into one. For embodiments where pyramidal support structure 985 is formed as a single, unitary structure with ground engaging member 945, phantom base edge 1041 may represent a virtual boundary between the two components.

As shown in FIG. 12, pyramidal support structure 985 may have a substantially triangular base 1045 where pyramidal support structure 985 abuts the baseplate. In some embodiments, substantially triangular base 1045 may have a surface area that is greater than the surface area of base 1040 of ground engaging member 945.

Pyramidal support structure 985 may include a first base edge 1050 extending between first vertex 1000 and second vertex 1005, and a second base edge 1055 extending between first vertex 1000 and third vertex 1010. In some embodiments, substantially triangular base 1045, which is defined between first base edge 1050, second base edge 1055 and a virtual third base edge 1060, may have a surface area that is larger than the surface area of substantially circular base 1040 of ground engaging member 945. Accordingly, in some embodiments, first base edge 1050 and second base edge 1055 may be located radially outward from substantially circular base edge 1041 of substantially circular base 1040 of ground engaging member 945 with respect to a center 1075 of ground engaging member 945 located at a central axis 972 of ground engaging member 945, as shown in FIG. 12.

As further shown in FIG. 12, first side edge 1015, second side edge 1020, and third side edge 1025 of pyramidal support structure 985 may be oriented along axes that intersect at an apex. In some embodiments, this apex may be located on central axis 972 of ground engaging member 945, as shown in FIG. 12.

As also shown in FIG. 12, first radial wall 1030 of pyramidal support structure 985 may be aligned with a first radial axis 1065, which, in some embodiments, may extend through central axis 1072 of ground engaging member 945. In addition, second radial wall 1035 of pyramidal support structure 985 may be aligned with a second radial axis 1070, which, in some embodiments, may extend through central axis 1072 of ground engaging member 945.

Figure 13:
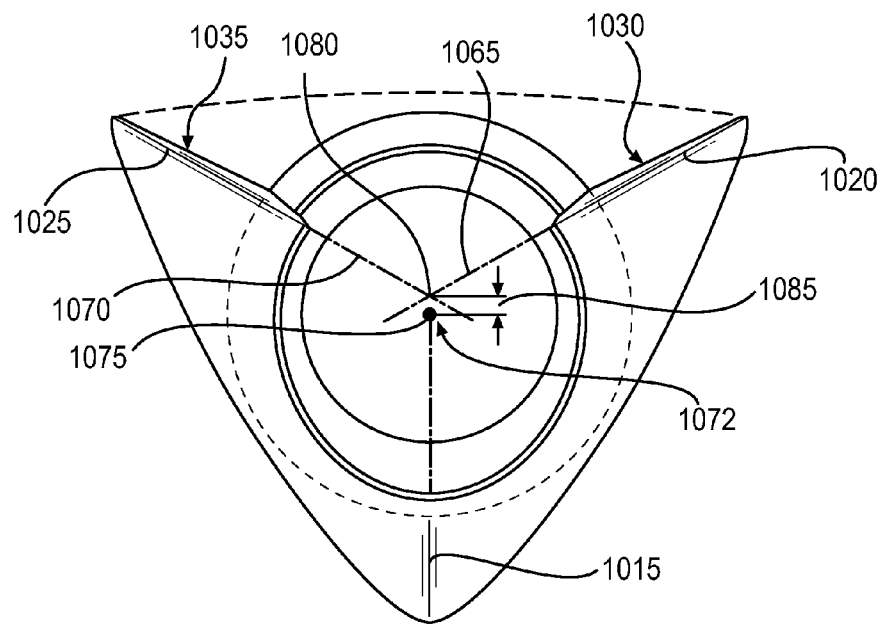
FIG. 13 is an enlarged bottom view of another ground engaging member configuration.

FIG. 13 shows an alternative configuration of pyramidal support structure 985. As shown in FIG. 13, in some embodiments, first radial axis 1065 and second radial axis 1070 may intersect at an intersection 1080 that may be at a location displaced from central axis 1072 of ground engaging member 945. This displacement is illustrated in FIG. 13 by a dimension 1085. It should be noted that, although FIG. 13 shows displacement of intersection 1080 in only one direction, in other embodiments, this displacement may be in any direction relative to central axis 1072. The location of this displacement may be selected to provide variations in traction and/or support provided by pyramidal support structure 985.

Figure 14:
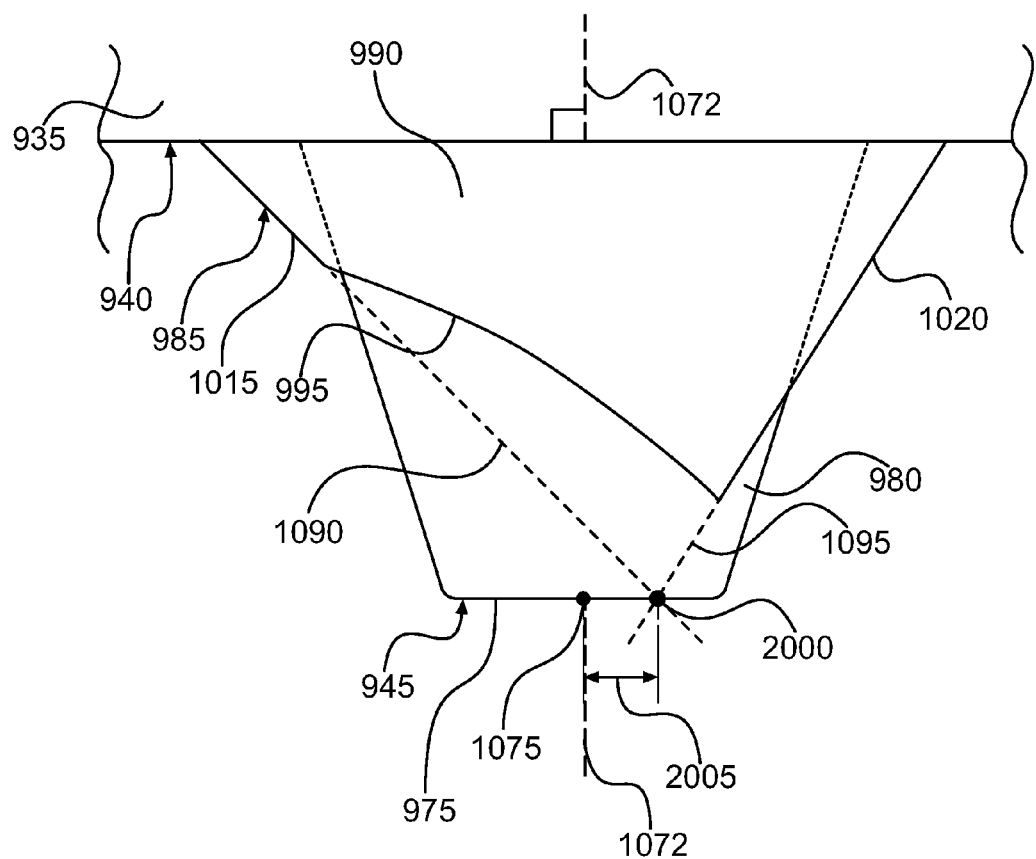
FIG. 14 is an enlarged side view of the ground engaging member configuration shown in FIG. 13.

FIG. 14 shows a side view of ground engaging member 945. As illustrated in FIG. 14, central axis 1072 may extend substantially normal to baseplate 935. Further, first side edge 1015 may be oriented along a first side edge axis 1090, and second side edge 1020 may be oriented along a second side edge axis 1095. In addition, although not shown in FIG. 14, the third side edge of pyramidal support structure 985 may be oriented along a third side edge axis. First side edge axis 1090 and second side edge axis 1095 (as well as the third side edge axis) may intersect at an apex 2000, as shown in FIG. 14. As further shown in FIG. 14, apex 2000 may be located offset with respect to central axis 1072 and center 1075 of ground engaging member 945, for example, by a dimension 2005. It will be noted that, although apex 2000 is shown as being displaced in a particular direction relative to central axis 1072, apex 2000 may be offset in any suitable direction to achieve desired traction and support. In addition, although apex 2000 is shown to coincide with tip 975 of ground engaging member 945, apex 2000 may be located above or below tip 975 in order to provide desired traction and support.

Figure 15:
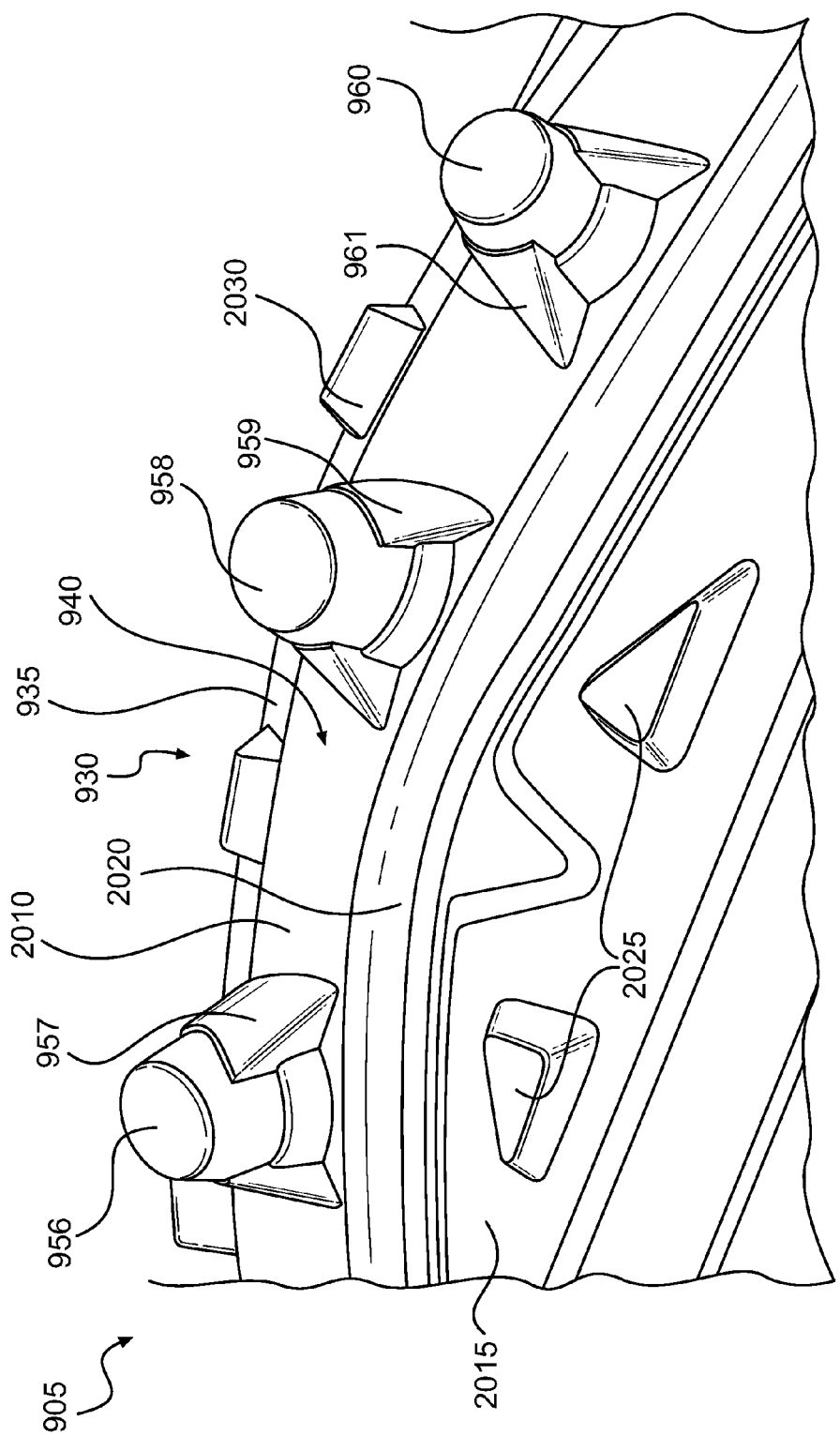
FIG. 15 is an enlarged perspective view of the sole structure shown in FIG. 9.

FIG. 15 is an enlarged view of the forefoot region of the article of footwear shown in FIG. 9. As shown in FIG. 15, baseplate 935 may include a peripheral portion 2010. Peripheral portion 2010 may serve as a platform upon which ground engaging members (such as sixth ground engaging member, seventh ground engaging member, and eighth ground engaging member) may be based. In addition, baseplate 935 may also include a central portion 2015, which, in some areas, may be separated from peripheral portion 2010 by a groove 2020. To provide additional traction, in some embodiments, sole component 930 may include additional central ground engaging members 2025. In addition, sole component 930 may also include sidewall ground engaging members 2030. Central ground engaging members 2025 and/or sidewall ground engaging members 2030 may have any suitable configuration to provide desired traction and stability.

In some embodiments the exposed portions of ground engaging members may be oriented in various directions. In some embodiments, the exposed portion of one ground engaging member may be oriented radially inward toward a central longitudinal axis of the sole component. Accordingly, in some embodiments, exposed portions of ground engaging members on opposite sides of sole component may face each other. Having exposed portions of ground engaging members, and radial walls of pyramidal support structures oriented inward may provide grip at the periphery of the sole component. In addition, having the closed side edge of the pyramid facing outward (away from the central longitudinal axis) may provide increased ground penetration at the periphery of the sole component.

Figure 16:
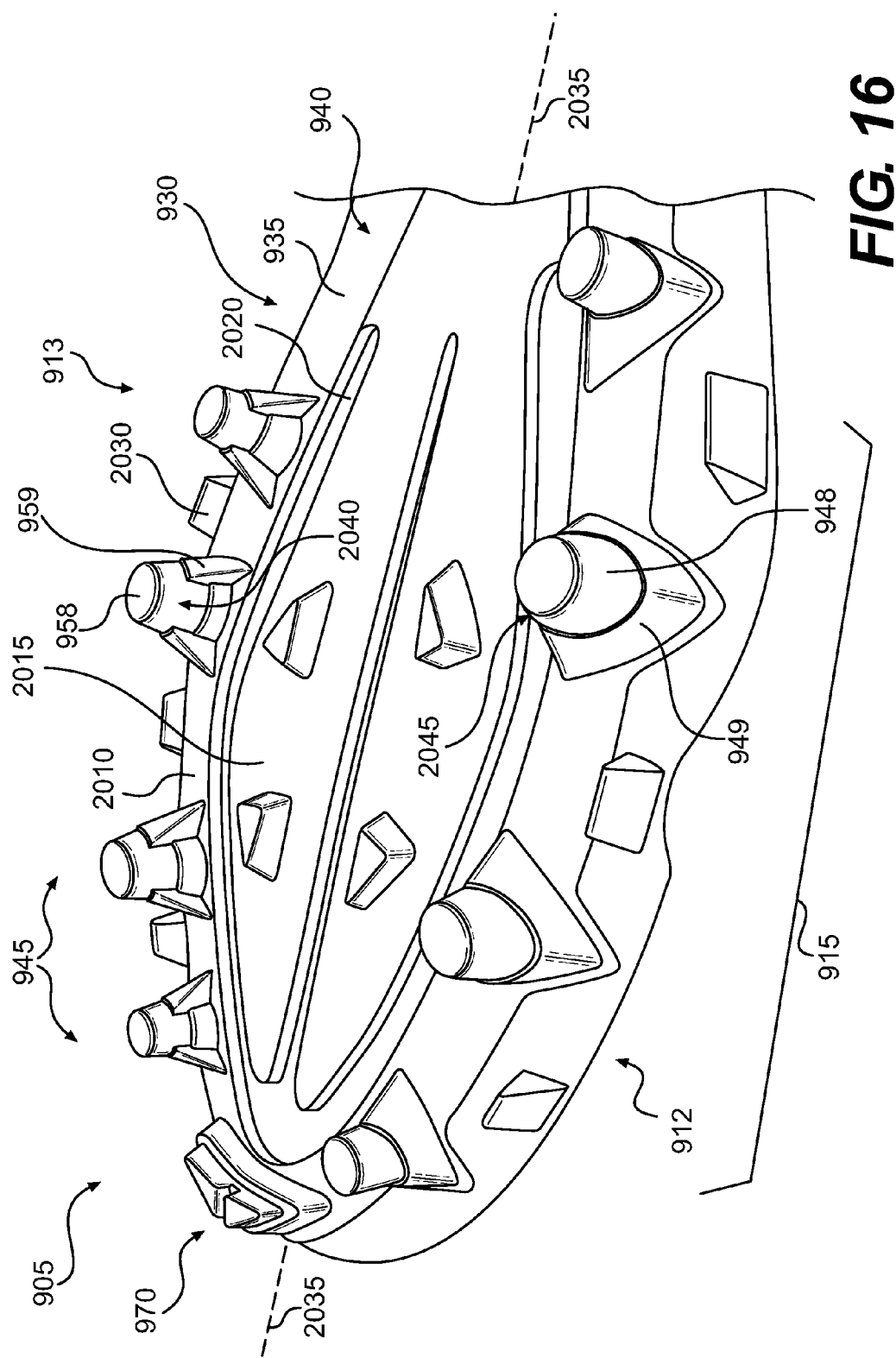
FIG. 16 is a perspective view of a forefoot region of the sole structure shown in FIG. 9.

FIG. 16 illustrates forefoot region 915 of sole component 930. As shown in FIG. 16, sole component 930 may have a longitudinal central axis 2035. As also shown in FIG. 16, a first exposed sidewall 2040 of seventh ground engaging member 958 may face substantially inward, from a peripheral edge of baseplate 935 adjacent to seventh ground engaging member 958 on a medial side 913 of baseplate 935, toward central longitudinal axis 2035. In addition, a second exposed sidewall 2045 of second ground engaging member 948 may also face inward, from the peripheral edge of baseplate 935 adjacent to second ground engaging member 948 on a lateral side 912 of baseplate 935, toward central longitudinal axis 2035. Accordingly, first exposed sidewall 2040 and second exposed sidewall 2045 may be oriented substantially facing each other.

Figure 17:
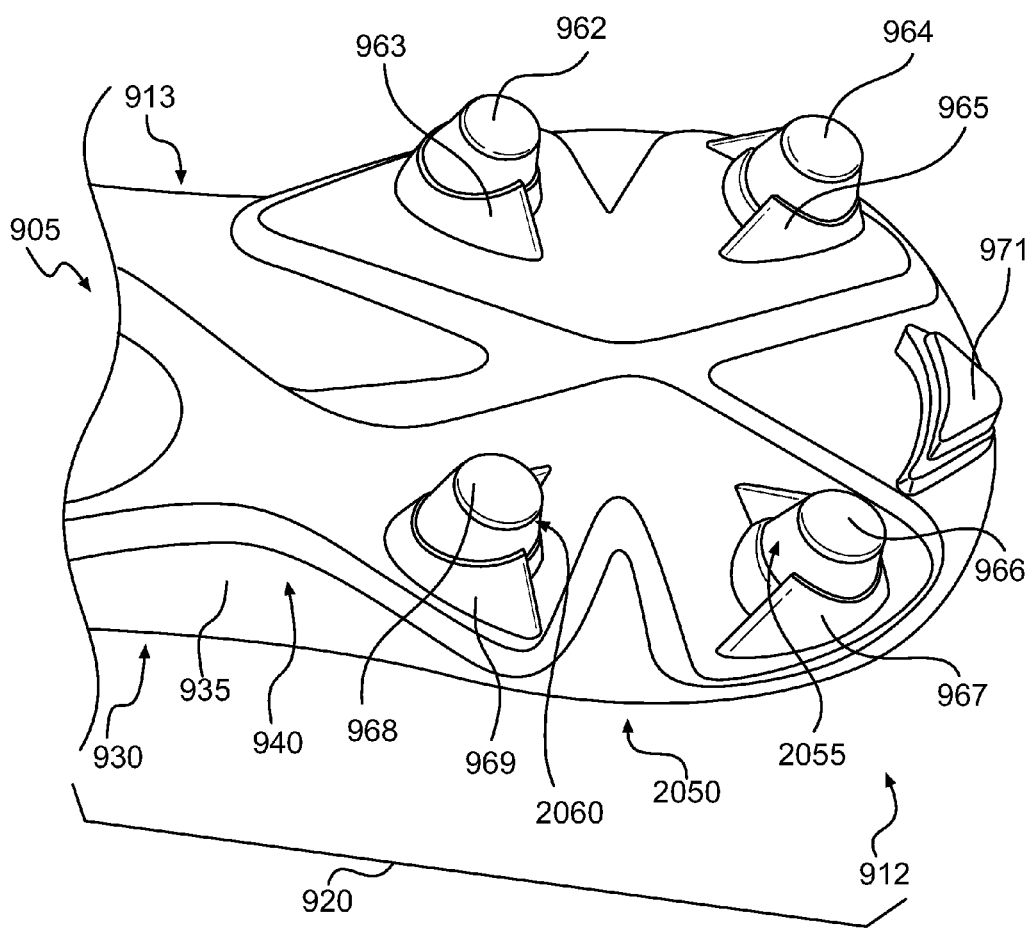
FIG. 17 is a perspective view of a heel region of the sole structure shown in FIG. 9.

FIG. 17 illustrates heel region 920 of sole component 930. As shown in FIG. 17, baseplate 935 may include a peripheral edge 2050. In some embodiments, a third exposed sidewall 2055 of eleventh ground engaging member 966 may be oriented in a forward direction, facing a fourth exposed sidewall 2060 of twelfth ground engaging member 968, which may face rearward, on the same side of baseplate 935. Thus, ground engaging members located at peripheral edge 2050 on a lateral side 912 (or on medial side 913) may have exposed portions facing fore and aft as opposed to laterally as in the forefoot. That is, the pyramidal support structures may be oriented differently in the forefoot region than in the heel region to address differing loading experienced in these two regions. For example, the disclosed configurations may provide increased traction and support in the lateral direction in the forefoot region of the article of footwear, whereas this heel configuration may provide increased traction and support in the fore-aft direction.

While various embodiments of the invention have been described, the description is intended to be exemplary, rather than limiting and it will be apparent to those of ordinary skill in the art that many more embodiments and implementations are possible that are within the scope of the invention. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination. Accordingly, the invention is not to be restricted except in light of the attached claims and their equivalents. Also, various modifications and changes may be made within the scope of the attached claims.

What is claimed is:

1. An article of footwear, including an upper configured to receive a foot and a sole structure fixedly attached to a bottom portion of the upper, the sole structure including a sole component comprising:
    a baseplate having a bottom surface;
    at least a first ground engaging member extending substantially downward from the bottom surface of the baseplate, the first ground engaging member having a substantially circular cross-sectional shape; and
    a tapered support structure having a substantially pyramidal shape and extending substantially downward from the bottom surface of the baseplate, abutting the first ground engaging member at a side portion, and partially surrounding the first ground engaging member such that a portion of the first ground engaging member is exposed between edges of the tapered support structure;
    wherein the tapered support structure extends downward from the baseplate less than the first ground engaging member.

2. The article of footwear of claim 1, wherein the tapered support structure has a substantially triangular pyramidal shape.

3. The article of footwear of claim 1, wherein the tapered support structure extends more than half way around a circumference of first ground engaging member.

4. The article of footwear of claim 1, wherein the ground engaging member has a stepped cross-sectional size with an upper portion of the ground engaging member having a larger cross-sectional size than a lower portion of the ground engaging member, the transition between the upper portion and the lower portion forming a step; and
    wherein the tapered support structure extends downward from the baseplate below the step in the cross-section of the ground engaging member.

5. The article of footwear of claim 1, wherein the first ground engaging member has a first sidewall and the tapered support structure has a second sidewall;
    wherein the second sidewall intersects the first sidewall at a junction; and
    wherein the junction between the first side wall and the second sidewall is non-horizontal.

6. The article of footwear of claim 1, wherein the first ground engaging member has a substantially circular base where the first ground engaging member abuts the baseplate;
    wherein the tapered support structure has a substantially triangular pyramidal shape including a substantially triangular base where the tapered support structure abuts the baseplate; and
    wherein the substantially triangular base has a surface area that is greater than a surface area of the base of the first ground engaging member.

7. The article of footwear of claim 6, wherein the substantially triangular base of the tapered support structure has a first vertex, a second vertex, a third vertex, a first base edge extending between the first and second vertex, and a second base edge extending between the first and third vertex, wherein the first base edge and the second base edge are located radially outward from a third base edge of the substantially circular base of the first ground engaging member with respect to a center of the first ground engaging member.

8. The article of footwear of claim 6, wherein the substantially triangular base of the tapered support structure includes a first vertex, a second vertex, and a third vertex;
    the tapered support structure further including a first side edge extending from the first vertex to a sidewall of the first ground engaging member, a second side edge extending from the second vertex to the sidewall of the first ground engaging member, and a third side edge extending from the third vertex to the sidewall of the first ground engaging member;
    wherein the first side edge, the second side edge, and the third side edge of the tapered support structure are oriented along axes that intersect at an apex.

9. The article of footwear of claim 8, wherein the first ground engaging member has a central axis extending substantially normal to the baseplate; and
    wherein the apex is located on the central axis of the first ground engaging member.

10. The article of footwear of claim 8, wherein the first ground engaging member has a central axis extending substantially normal to the baseplate; and wherein the apex is located offset with respect to the central axis of the first ground engaging member.

11. The article of footwear of claim 1, wherein the tapered support structure has a substantially triangular pyramidal shape and includes:

a substantially triangular base where the tapered support structure abuts the baseplate, the substantially triangular base including a first vertex, a second vertex, and a third vertex;

a first side edge extending from the first vertex to a sidewall of the first ground engaging member, a second side edge extending from the second vertex to the sidewall of the first ground engaging member, and a third side edge extending from the third vertex to the sidewall of the first ground engaging member;

a first radial wall extending from the second side edge substantially radially inward to a side wall of the first ground engaging member; and a second radial wall extending from the third side edge substantially radially inward to the side wall of the first ground engaging member;

wherein the exposed portion of the first ground engaging member is a portion of the side wall of the first ground engaging member between the first radial wall and the second radial wall.

12. The article of footwear of claim 11, wherein the first ground engaging member has a central axis extending substantially normal to the baseplate;

wherein the first radial wall of the tapered support structure is aligned with a first radial axis extending through the central axis of the first ground engaging member; and wherein the second radial wall of the tapered support structure is aligned with a second radial axis extending through the central axis of the first ground engaging member.

13. The article of footwear of claim 11, wherein the first ground engaging member has a central axis extending substantially normal to the baseplate;

wherein the first radial wall of the tapered support structure is aligned with a first radial axis;

wherein the second radial wall of the tapered support structure is aligned with a second radial axis; and wherein the first radial axis intersects the second radial axis at a location displaced from the central axis of the first ground engaging member.

14. The article of footwear of claim 1, wherein the exposed portion of the first ground engaging member faces substantially inward from a peripheral edge of the baseplate adjacent to the first ground engaging member.

15. The article of footwear of claim 1, further including a second ground engaging member extending substantially downward from the bottom surface of the baseplate, the second ground engaging member having a substantially circular cross-sectional shape;

a second tapered support structure having a substantially pyramidal shape and extending substantially downward from the bottom surface of the baseplate, abutting the second ground engaging member at a side portion, and partially surrounding the second ground engaging member such that a second sidewall portion of the second ground engaging member is exposed between edges of the second tapered support structure;

wherein exposed first sidewall portion of the first ground engaging member is facing the exposed second sidewall portion of the second ground engaging member.

16. The article of footwear of claim 15, wherein the first ground engaging member is located at a peripheral edge of the baseplate on a medial side of the baseplate in a forefoot region of the article of footwear, and the second ground engaging member is located at a peripheral edge of the baseplate on a lateral side of the baseplate in the forefoot region of the article of footwear.

17. The article of footwear of claim 15, wherein the first ground engaging member is located at a peripheral edge of the baseplate on a side of the baseplate in a heel region of the article of footwear, and the second ground engaging member is located at the peripheral edge of the baseplate in the heel region of the article of footwear on the same side of the baseplate as the first ground engaging member.

18. An article of footwear, including an upper configured to receive a foot and a sole structure fixedly attached to a bottom portion of the upper, the sole structure including a sole component comprising:

a baseplate having a bottom surface;

at least a first ground engaging member extending substantially downward from the bottom surface of the baseplate, the first ground engaging member having a substantially circular cross-sectional shape and a central axis extending substantially normal to the baseplate; and a tapered support structure extending substantially downward from the bottom surface of the baseplate and abutting the first ground engaging member at a side portion;

the tapered support structure including:

a polygonal base where the tapered support structure abuts the baseplate, the polygonal base having at least a first vertex, a second vertex, and a third vertex;

a first side edge extending from the first vertex to a sidewall of the first ground engaging member, a second side edge extending from the second vertex to the sidewall of the first ground engaging member, and a third side edge extending from the third vertex to the sidewall of the first ground engaging member;

wherein the first side edge, the second side edge, and the third side edge of the tapered support structure are oriented along axes that intersect at an apex; and wherein the apex is located offset with respect to the central axis of the first ground engaging member;

the tapered support structure further including:

a first radial wall extending from the second side edge substantially radially inward to the side wall of the first ground engaging member; and a second radial wall extending from the third side edge substantially radially inward to the side wall of the first ground engaging member:

wherein a portion of the sidewall of the first ground engaging member is exposed between the first radial wall and the second radial wall.

19. The article of footwear of claim 18, wherein the tapered support structure is a pyramidal support structure having a substantially triangular pyramidal shape.

20. The article of footwear of claim 18, wherein the exposed portion of the first ground engaging member faces substantially inward from a peripheral edge of the baseplate adjacent to the first ground engaging member.

21. The article of footwear of claim 18, wherein the first radial wall of the pyramidal support structure is aligned with a first radial axis;

wherein the second radial wall of the pyramidal support structure is aligned with a second radial axis; and wherein the first radial axis intersects the second radial axis at a location displaced from the central axis of the first ground engaging member.

22. An article of footwear, including an upper configured to receive a foot and a sole structure fixedly attached to a bottom portion of the upper, the sole structure including a sole component comprising:
- a baseplate having a bottom surface;
- a ground engaging member extending substantially downward from the bottom surface of the baseplate; and
- a tapered support structure extending substantially downward from the bottom surface of the baseplate and abutting the ground engaging member at a side portion of the ground engaging member, the tapered support structure at least partially surrounding the ground engaging member;
- wherein the ground engaging member has a stepped cross-sectional size with an upper portion of the ground engaging member having a larger cross-sectional size than a lower portion of the ground engaging member, the transition between the upper portion and the lower portion forming a step;
- wherein the tapered support structure extends downward from the baseplate below the step in the cross-section of the ground engaging member;
- wherein the ground engaging member has a first sidewall and the tapered support structure has a second sidewall;
- wherein the second sidewall intersects the first sidewall at a junction and
- where the junction between the first side wall and the second sidewall is non-horizontal.

23. The article of footwear of claim 22, wherein the tapered support structure is a pyramidal support structure including a polygonal base where the pyramidal support structure abuts the baseplate the polygonal base having at least a first vertex, a second vertex, and a third vertex.

24. The article of footwear of claim 23, wherein the pyramidal support structure extends downward from the baseplate less than the first ground engaging member.

25. The article of footwear of claim 22, wherein the tapered support structure is a pyramidal support structure including a polygonal base where the pyramidal support structure abuts the baseplate the polygonal base having at least a first vertex, a second vertex, and a third vertex;
- the pyramidal support structure further including a first side edge extending substantially downward from the first vertex, a second side edge extending substantially downward from the second vertex, and a third side edge extending substantially downward from the third vertex.

26. The article of footwear of claim 25,
- wherein a portion of the ground engaging member is exposed between two or more of the side edges of the pyramidal support structure.

27. The article of footwear of claim 26, wherein the junction between the first side wall of the ground engaging member and the second sidewall of the support structure extends lower proximate to the exposed portion of the ground engaging member than on an opposite side of the ground engaging member.

* * * * *